(12) United States Patent
Yamamoto et al.

(10) Patent No.: US 11,075,405 B2
(45) Date of Patent: Jul. 27, 2021

(54) ELECTROLYTE, BATTERY, AND ELECTRONIC APPARATUS

(71) Applicant: SEIKO EPSON CORPORATION, Tokyo (JP)

(72) Inventors: Hitoshi Yamamoto, Chino (JP); Tomofumi Yokoyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 253 days.

(21) Appl. No.: 16/276,976

(22) Filed: Feb. 15, 2019

(65) Prior Publication Data

US 2019/0260072 A1 Aug. 22, 2019

(30) Foreign Application Priority Data

Feb. 16, 2018 (JP) .............................. JP2018-025777

(51) Int. Cl.
| | |
|---|---|
| *H01M 10/0562* | (2010.01) |
| *H01M 10/052* | (2010.01) |
| *H01M 4/38* | (2006.01) |
| *H01M 4/02* | (2006.01) |

(52) U.S. Cl.
CPC ....... *H01M 10/0562* (2013.01); *H01M 4/382* (2013.01); *H01M 10/052* (2013.01); *H01M 2004/028* (2013.01); *H01M 2300/0077* (2013.01)

(58) Field of Classification Search
CPC ..... H01M 10/0562; H01M 2300/0071; H01M 2300/0077; H01M 2300/0091
See application file for complete search history.

(56) References Cited

U.S. PATENT DOCUMENTS

| | | | |
|---|---|---|---|
| 2011/0053001 A1* | 3/2011 | Babic | C04B 35/6264 429/322 |
| 2011/0244337 A1 | 10/2011 | Ohta et al. | |
| 2013/0230778 A1* | 9/2013 | Saimen | H01M 10/056 429/303 |
| 2014/0072875 A1 | 3/2014 | Uchiyama | |
| 2015/0056519 A1 | 2/2015 | Ohta et al. | |
| 2015/0250758 A1 | 9/2015 | Hwang et al. | |
| 2016/0336617 A1 | 11/2016 | Yamazaki | |

FOREIGN PATENT DOCUMENTS

| | | |
|---|---|---|
| JP | 2003-346895 A | 12/2003 |
| JP | 2009-215130 A | 9/2009 |
| JP | 2010-202499 A | 9/2010 |
| JP | 2012-243443 A | 12/2012 |

(Continued)

*Primary Examiner* — Stephan J Essex
(74) *Attorney, Agent, or Firm* — Oliff PLC

(57) ABSTRACT

An electrolyte according to the invention includes a first electrolyte portion, in which one or more types of elements among the elements constituting a crystalline lithium composite metal oxide represented by the compositional formula (1) are substituted with a first metal element having a crystal radius of 78 pm or more, and an amorphous second electrolyte portion, which contains Li and one or more types of second metal elements contained in the first electrolyte portion other than Li.

$$Li_7(La_{3-x}Nd_x)Zr_2O_{12} \qquad (1)$$

In the formula, x satisfies the following formula: $0.0 < x \le 0.6$.

9 Claims, 12 Drawing Sheets

(56) References Cited

FOREIGN PATENT DOCUMENTS

| | | |
|---|---|---|
| JP | 2015-022960 A | 2/2015 |
| JP | 2015-041573 A | 3/2015 |
| JP | 2015-164116 A | 9/2015 |
| JP | 2015-529243 A | 10/2015 |
| JP | 2016-219130 A | 12/2016 |
| JP | 2017-162728 A | 9/2017 |
| JP | 2017-168395 A | 9/2017 |
| JP | 2017-168396 A | 9/2017 |

* cited by examiner

FIG. 6

| | ELECTROLYTE | |
|---|---|---|
| | FIRST ELECTROLYTE PORTION AND AND SECOND ELECTROLYTE PORTION | THIRD ELECTROLYTE PORTION |
| EXAMPLE 1 | $Li_{6.9}La_{2.95}Nd_{0.05}Zr_{1.9}Nb_{0.05}Sb_{0.05}O_{12}$ | WITHOUT |
| EXAMPLE 2 | $Li_{6.9}La_{2.95}Nd_{0.05}Zr_{1.9}Nb_{0.05}Sb_{0.05}O_{12}$ | LCBO |
| EXAMPLE 3 | $Li_{6.9}La_{2.95}Nd_{0.05}Zr_{1}Ta_{0.3}Sb_{0.7}O_{12}$ | WITHOUT |
| EXAMPLE 4 | $Li_{6.9}La_{2.95}Nd_{0.05}Zr_{1}Ta_{0.3}Sb_{0.7}O_{12}$ | LCBO |
| EXAMPLE 5 | $Li_{6}La_{2.4}Nd_{0.6}Zr_{1}Nb_{0.3}Ta_{0.7}O_{12}$ | WITHOUT |
| EXAMPLE 6 | $Li_{6}La_{2.4}Nd_{0.6}Zr_{1}Nb_{0.3}Ta_{0.7}O_{12}$ | LCBO |
| EXAMPLE 7 | $Li_{6.9}La_{2.4}Nd_{0.6}Zr_{1.9}Nb_{0.05}Sb_{0.05}O_{12}$ | WITHOUT |
| EXAMPLE 8 | $Li_{6.9}La_{2.4}Nd_{0.6}Zr_{1.9}Nb_{0.05}Sb_{0.05}O_{12}$ | LCBO |
| EXAMPLE 9 | $Li_{6.2}La_{2.94}Nd_{0.06}Zr_{1.2}Ta_{0.4}Sb_{0.4}O_{12}$ | WITHOUT |
| EXAMPLE 10 | $Li_{6.2}La_{2.94}Nd_{0.06}Zr_{1.2}Ta_{0.4}Sb_{0.4}O_{12}$ | LCBO |
| EXAMPLE 11 | $Li_{6.3}La_{2.95}Nd_{0.05}Zr_{1.3}Ta_{0.2}Sb_{0.5}O_{12}$ | WITHOUT |
| COMPARATIVE EXAMPLE 1 | $Li_{7}La_{2.4}Nd_{0.6}Zr_{2}O_{12}$ | WITHOUT |
| COMPARATIVE EXAMPLE 2 | $Li_{6.5}La_{3}Zr_{1.5}Nb_{0.25}Sb_{0.25}O_{12}$ | LCBO |
| COMPARATIVE EXAMPLE 3 | $Li_{6.3}La_{3}Zr_{1.3}Ta_{0.2}Sb_{0.5}O_{12}$ | WITHOUT |

| | LITHIUM ION CONDUCTIVITY [S/cm] | | |
|---|---|---|---|
| | GRAIN BULK CONDUCTIVITY | GRAIN BOUNDARY CONDUCTIVITY | TOTAL ION CONDUCTIVITY |
| EXAMPLE 1 | — | — | $3.5 \times 10^{-4}$ |
| EXAMPLE 3 | — | — | $5.0 \times 10^{-4}$ |
| EXAMPLE 5 | — | — | $4.5 \times 10^{-4}$ |
| EXAMPLE 7 | — | — | $3.7 \times 10^{-4}$ |
| EXAMPLE 9 | — | — | $6.5 \times 10^{-4}$ |
| COMPARATIVE EXAMPLE 1 | — | — | $2.6 \times 10^{-7}$ |
| COMPARATIVE EXAMPLE 2 | — | — | $1.2 \times 10^{-4}$ |

FIG. 11

| | CHARGE CONDITIONS | | CHARGE CAPACITY [μAh] | | DISCHARGE CONDITIONS | | DISCHARGE CAPACITY [μAh] | | |
|---|---|---|---|---|---|---|---|---|---|
| | CHARGE CURRENT [μA] | CHARGE RATE | 1ST CYCLE | 10TH CYCLE | DISCHARGE CURRENT [μA] | DISCHARGE RATE | 1ST CYCLE | 10TH CYCLE | DISCHARGE CAPACITY RETENTION |
| EXAMPLE 1 | 50 | 0.1C | 500 | 500 | 50 | 0.1C | 450 | 405 | 90% |
| EXAMPLE 2 | 150 | 0.3C | 500 | 500 | 150 | 0.3C | 451 | 406 | 90% |
| EXAMPLE 3 | 50 | 0.1C | 500 | 500 | 50 | 0.1C | 465 | 420 | 90% |
| EXAMPLE 4 | 150 | 0.3C | 500 | 500 | 150 | 0.3C | 467 | 420 | 90% |
| EXAMPLE 5 | 50 | 0.1C | 500 | 500 | 50 | 0.1C | 450 | 405 | 90% |
| EXAMPLE 6 | 150 | 0.3C | 500 | 500 | 150 | 0.3C | 455 | 410 | 90% |
| EXAMPLE 7 | 50 | 0.1C | 500 | 500 | 50 | 0.1C | 450 | 405 | 90% |
| EXAMPLE 8 | 150 | 0.3C | 500 | 500 | 150 | 0.3C | 452 | 407 | 90% |
| EXAMPLE 9 | 50 | 0.1C | 500 | 500 | 50 | 0.1C | 465 | 420 | 90% |
| EXAMPLE 10 | 150 | 0.3C | 500 | 500 | 150 | 0.3C | 467 | 420 | 90% |
| COMPARATIVE EXAMPLE 2 | 20 | 0.04C | 500 | 500 | 20 | 0.04C | 420 | 290 | 69% |

ELECTROLYTE, BATTERY, AND ELECTRONIC APPARATUS

BACKGROUND

1. Technical Field

The present invention relates to an electrolyte, a battery, and an electronic apparatus.

2. Related Art

Heretofore, there has been known a battery using a compound having a garnet-type crystal structure as an inorganic electrolyte. For example, JP-A-2010-202499 (Patent Document 1) proposes a garnet-type lithium ion conductive oxide, in which zirconium sites are partially substituted with an element such as niobium or tantalum for improving the lithium ion conduction property in lithium lanthanum zirconate having a garnet-type crystal structure.

However, the garnet-type lithium ion conductive oxide described in Patent Document 1 has a problem that the sintering (firing) temperature is as high as 1200° C., and therefore, a side reaction at the crystal grain boundary or volatilization of lithium is likely to occur. When a side reaction at the crystal grain boundary or volatilization of lithium occurs, the lithium ion conduction property may be deteriorated. Further, when firing is performed at a lower temperature than in the related art, sufficient sintering does not occur at an interface between crystal grains, and there is a problem that the grain boundary resistance of crystal grains is hardly decreased and the lithium ion conduction property (total ion conductivity) is hardly improved.

SUMMARY

An advantage of some aspects of the invention is to solve at least a part of the above-mentioned problems and the invention can be implemented as the following forms or application examples.

Application Example

An electrolyte according to this application example includes a first electrolyte portion, in which one or more types of elements among the elements constituting a crystalline lithium composite metal oxide represented by the following compositional formula (1) are substituted with a first metal element having a crystal radius of 78 pm or more and an amorphous second electrolyte portion, which contains Li and one or more types of second metal elements contained in the first electrolyte portion other than Li.

$$\mathrm{Li}_7(\mathrm{La}_{3-x}\mathrm{Nd}_x)\mathrm{Zr}_2\mathrm{O}_{12} \tag{1}$$

In the formula (1), x satisfies the following formula: $0.0 < x \le 0.6$.

According to this application example, the electrolyte includes the crystalline first electrolyte portion and the amorphous second electrolyte portion, and therefore, as compared with the case where an electrolyte is constituted by only a crystalline material and the first electrolyte portions are joined to each other, a resistance occurring at the crystal interface (grain boundary resistance) of the first electrolyte portion is decreased. In addition, in the first electrolyte portion, the phase transition temperature from the tetragonal phase to the cubic phase is lowered. Therefore, the crystal (cubic crystal) of the first electrolyte portion grows at a lower temperature than in the related art. Accordingly, even if firing is performed at a lower temperature than in the related art, the stabilization of the crystal (cubic crystal) in the first electrolyte portion is promoted, and thus, the lithium ion conduction property of the electrolyte can be improved.

The first electrolyte portion is a crystalline lithium composite metal oxide having the compositional formula (1) as a basic structure. By using such a garnet-type crystal or a garnet-like-type crystal as the first electrolyte portion, the bulk lithium ion conductivity (grain bulk conductivity) can be improved in the electrolyte.

In the first electrolyte portion, one or more types of elements among the constituent elements of the compositional formula (1) are substituted with a first metal element. Due to this, the concentration gradient of the metal element occurs between the first electrolyte portion containing the first metal element and the second electrolyte portion containing the second metal element, so that the boundary therebetween gets into an ambiguous state and ion diffusion is promoted. Therefore, as compared with the case where the boundary is clear, the grain boundary resistance is decreased, and the lithium ion conduction property can be further improved. In addition, the first metal element hardly falls off from the first electrolyte portion even by firing at a relatively high temperature, and a stable lithium ion conduction property can be obtained.

According to this configuration, an electrolyte in which the firing temperature is lowered, and also the grain boundary resistance is decreased, and the lithium ion conduction property is improved as compared with the related art can be provided.

In the electrolyte according to the above-mentioned application example, it is preferred that in the first electrolyte portion, Zr among the elements constituting the lithium composite metal oxide is partially substituted with the first metal element.

According to this configuration, Zr is partially substituted with the first metal element, and therefore, an excellent lithium ion conduction property can be realized.

In the electrolyte according to the above-mentioned application example, it is preferred that the first electrolyte portion contains a crystalline lithium composite metal oxide represented by the following compositional formula (2).

$$\mathrm{Li}_{7-y}(\mathrm{La}_{3-x}\mathrm{Nd}_x)(\mathrm{Zr}_{2-y}\mathrm{M}_y)\mathrm{O}_{12} \tag{2}$$

In the formula (2), x and y satisfy the following formulae: $0.0 < x \le 0.6$ and $0.1 \le y \le 1.0$, and M represents the first metal element.

According to this configuration, Zr is partially substituted with the first metal element, and therefore, an excellent lithium ion conduction property can be realized. Further, in the compositional formula (2), y is 0.1 or more, and therefore, the second electrolyte portion is easily formed. Since y is 1.0 or less, generation of an oxide of only the first metal element is suppressed, and the lithium ion conduction property can be further improved.

In the electrolyte according to the above-mentioned application example, it is preferred that the first electrolyte portion contains one or more types of Nb, Sb, and Ta as the first metal element.

According to this configuration, in the first electrolyte portion, one or more types of elements among the elements constituting the lithium composite metal oxide are substituted with Nb, Sb, or Ta, and therefore, an excellent lithium ion conduction property can be realized.

In the electrolyte according to the above-mentioned application example, it is preferred that the second electrolyte portion contains one or more types of Nb, Sb, and Ta as the second metal element, and Li, La, and Zr.

According to this configuration, since there is a difference in ease of entry into the crystal lattice of the first electrolyte portion among Nb, Sb, and Ta, the concentration gradient of one or more types of metal elements among Nb, Sb, and Ta occurs from the first electrolyte portion to the second electrolyte portion. That is, from the first electrolyte portion to the second electrolyte portion, the concentration of a metal element whose ease of entry described above is high (which easily enters) gradually decreases, and the concentration of a metal element whose ease of entry described above is low (which hardly enters) gradually increases. According to this configuration, the boundary between the first electrolyte portion and the second electrolyte portion becomes ambiguous, and ion diffusion is promoted. Therefore, as compared with the case where the boundary is clear, the grain boundary resistance is decreased, and the lithium ion conduction property can be further improved.

In the electrolyte according to the above-mentioned application example, it is preferred that the electrolyte includes an amorphous third electrolyte portion, which contains Li and is in contact with the first electrolyte portion and the second electrolyte portion.

According to this configuration, the first electrolyte portion is joined not only to the second electrolyte portion, but also to the third electrolyte portion, and therefore, the resistance occurring at the crystal interface of the first electrolyte portion is further decreased. In addition, the lithium ion conduction property of the electrolyte can be further improved.

In the electrolyte according to the above-mentioned application example, it is preferred that the third electrolyte portion contains Li, B, and O.

According to this configuration, the amorphous third electrolyte portion is easily formed, and the lithium ion conduction property of the electrolyte can be still further improved.

Application Example

A battery according to this application example includes a composite body which includes the electrolyte according to the above-mentioned application example and an active material, an electrode on one side of the composite body, and a current collector on the other side of the composite body.

According to this application example, the electrolyte in which the grain boundary resistance is decreased and the lithium ion conduction property is improved is used, and therefore, a battery having improved charge-discharge characteristics can be formed.

In the battery according to the above-mentioned application example, it is preferred that the active material is a positive electrode active material containing Li.

According to this configuration, the battery includes the positive electrode active material to serve as a lithium supply source, and therefore, the charge-discharge characteristics can be further improved. In addition, the capacity of the battery can be increased as compared with the related art.

Application Example

An electronic apparatus according to this application example includes the battery according to the above-mentioned application example.

According to this application example, an electronic apparatus including the battery, which has improved charge-discharge characteristics, is small, and has high quality, as a power supply source can be provided.

Application Example

A method for producing an electrolyte according to this application example includes preparing a mixture by mixing a plurality of types of raw materials containing elements constituting a crystalline lithium composite metal oxide represented by the following compositional formula (1) and a first metal element having a crystal radius of 78 pm or more, respectively, and forming a crystalline first electrolyte portion and an amorphous second electrolyte portion by subjecting the mixture to a heating treatment.

$$Li_7(La_{3-x}Nd_x)Zr_2O_{12} \qquad (1)$$

In the formula (1), x satisfies the following formula: $0.0 < x \leq 0.6$.

According to this application example, the first electrolyte portion in which Zr among the elements constituting the crystalline lithium composite metal oxide represented by the compositional formula (1) is partially substituted with the first metal element and the amorphous second electrolyte portion containing the second metal element and Li, La, and Zr can be formed in the same step. Specifically, the crystal of the first electrolyte portion is formed by partially substituting Zr constituting the lithium composite metal oxide of the compositional formula (1) with the first metal element. At this time, the amorphous second electrolyte portion containing the second metal element is formed in a state of being joined to the first electrolyte portion by the raw materials which do not contribute to the formation of the crystalline first electrolyte portion. According to such a method for producing an electrolyte, the concentration gradient of the metal element occurs between the first electrolyte portion and the second electrolyte portion, and the boundary between the first electrolyte portion and the second electrolyte portion becomes ambiguous, and ion diffusion is promoted. Due to this, an electrolyte in which the grain boundary resistance is decreased and the lithium ion conduction property is improved can be produced. Further, the first electrolyte portion and the second electrolyte portion are formed in the same step, and therefore, the production step of the electrolyte can be simplified.

In the method for producing an electrolyte according to the above-mentioned application example, it is preferred that the method includes dissolving the raw materials in a solvent, the mixture contains the solvent, and the heating treatment includes a first heating treatment in which the heating temperature is 500° C. or higher and 650° C. or lower, and a second heating treatment which is performed after the first heating treatment, and in which the heating temperature is 800° C. or higher and 1000° C. or lower.

According to this configuration, the first electrolyte portion and the second electrolyte portion are formed by a liquid phase method. In particular, the crystal grain of the first electrolyte portion is crystallized from the solution of the mixture, and therefore, the micronization is facilitated as compared with a solid phase method. Further, by the first heating treatment, the solvent contained in the mixture or an organic substance such as an impurity is decomposed and reduced. Therefore, in the second heating treatment, the purity is increased and the first electrolyte portion and the second electrolyte portion can be formed. Further, by setting the temperature of the heating treatment to 1000° C. or lower, the occurrence of a side reaction at the crystal grain boundary or volatilization of lithium can be suppressed. Accordingly, an electrolyte in which the lithium ion conduction property is further improved can be produced.

Application Example

A method for producing a battery according to this application example includes preparing a mixture by dissolving a plurality of types of raw materials containing elements constituting a crystalline lithium composite metal oxide represented by the following compositional formula (1) and a first metal element having a crystal radius of 78 pm or more, respectively, in a solvent, followed by mixing, forming a first molded body using an active material, forming a composite body which includes a crystalline first electrolyte portion and an amorphous second electrolyte portion obtained after a reaction, and the first molded body by subjecting the mixture to a heating treatment in a state of being impregnated into the first molded body to cause a reaction, and forming a current collector on the composite body.

$$Li_7(La_{3-x}Nd_x)Zr_2O_{12} \quad (1)$$

In the formula (1), x satisfies the following formula: $0.0 < x \leq 0.6$.

According to this application example, the first electrolyte portion and the second electrolyte portion are formed in the inside including the surface of the first molded body which includes the active material by a liquid phase method. Therefore, the composite body is formed such that the active material, the first electrolyte portion, and the second electrolyte portion are in contact with one another. The composite body having such a configuration can be easily produced, and also a battery in which the grain boundary resistance of the electrolyte is decreased and the lithium ion conduction property is improved by the configuration can be produced.

Application Example

A method for producing a battery according to this application example includes preparing a mixture by dissolving a plurality of types of raw materials containing elements constituting a crystalline lithium composite metal oxide represented by the following compositional formula (1) and a first metal element having a crystal radius of 78 pm or more, respectively, in a solvent, followed by mixing, forming a first molded body using an active material, forming a second molded body which includes a crystalline first electrolyte portion and an amorphous second electrolyte portion obtained after a reaction, and the first molded body by subjecting the mixture to a heating treatment in a state of being impregnated into the first molded body to cause a reaction, filling the second molded body with the melt of a third electrolyte containing Li, B, and O by melting the third electrolyte by heating in a state where the third electrolyte is brought into contact with the second molded body, forming a composite body which includes the first electrolyte portion, the second electrolyte portion, a third electrolyte portion, and the active material by cooling the second molded body filled with the melt of the third electrolyte, and forming a current collector on the composite body.

$$Li_7(La_{3-x}Nd_x)Zr_2O_{12} \quad (1)$$

In the formula (1), x satisfies the following formula: $0.0 < x \leq 0.6$.

According to this application example, the second molded body is produced by forming the first electrolyte portion and the second electrolyte portion in the inside including the surface of the first molded body which includes the active material by a liquid phase method. Further, the composite body is produced by filling the melt of the third electrolyte in the inside including the surface of the second molded body. Therefore, the composite body is formed such that the active material, the first electrolyte portion and the second electrolyte portion, and the third electrolyte portion are in contact with one another. The composite body having such a configuration can be easily produced, and also a battery in which the grain boundary resistance of the electrolyte is decreased and the lithium ion conduction property is improved by the configuration can be produced.

In the method for producing a battery according to the above-mentioned application example, it is preferred that the heating treatment includes a first heating treatment in which the heating temperature is 500° C. or higher and 650° C. or lower, and a second heating treatment which is performed after the first heating treatment, and in which the heating temperature is 800° C. or higher and 1000° C. or lower.

According to this configuration, by the first heating treatment, the solvent contained in the mixture or an organic substance such as an impurity is decomposed and reduced. Therefore, in the second heating treatment, the purity is increased and the first electrolyte portion and the second electrolyte portion can be formed. Further, by setting the temperature of the heating treatment to 1000° C. or lower, the occurrence of a side reaction at the crystal grain boundary or volatilization of lithium can be suppressed. Accordingly, a battery in which the lithium ion conduction property is further improved can be produced.

BRIEF DESCRIPTION OF THE DRAWINGS

The invention will be described with reference to the accompanying drawings, wherein like numbers reference like elements.

FIG. 6 is a table showing the compositions of solid electrolytes according to Examples and Comparative Examples.

FIG. 11 is a table showing the charge and discharge conditions and the evaluation results of lithium batteries of Examples and Comparative Examples.

DESCRIPTION OF EXEMPLARY EMBODIMENTS

Hereinafter, embodiments of the invention will be described with reference to the drawings. Incidentally, in the following respective drawings, in order to make respective layers and respective members have a recognizable size, the dimensions of the respective layers and the respective members are made different from the actual ones.

First Embodiment

Battery

Figure 1:
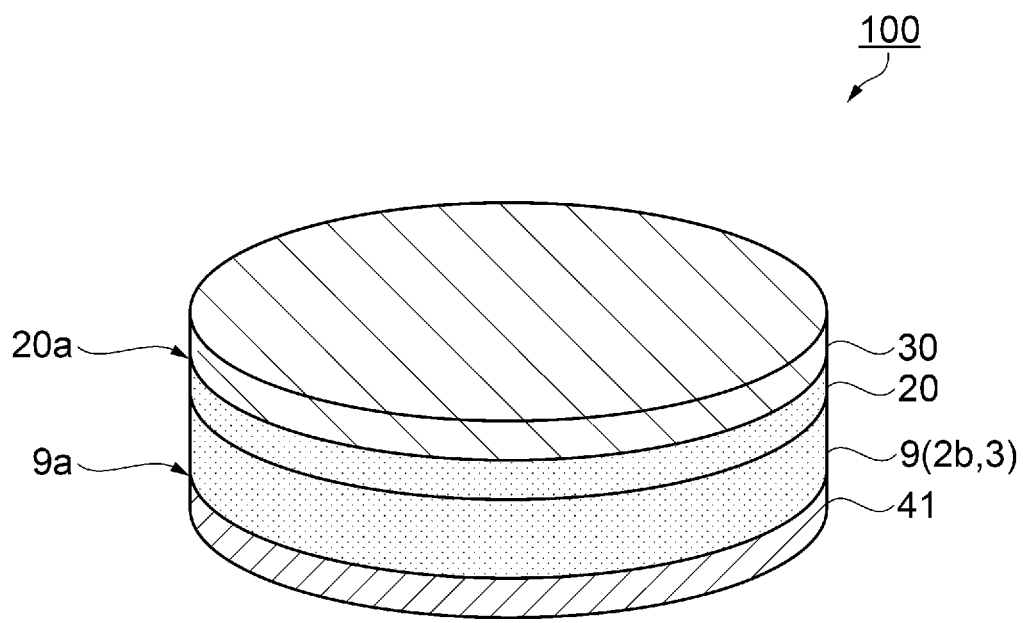
FIG. 1 is a schematic perspective view showing a structure of a lithium battery as a battery according to a first embodiment.

First, a battery according to this embodiment will be described with reference to FIG. 1. In this embodiment, a lithium battery will be described as an example of the battery. FIG. 1 is a schematic perspective view showing a structure of a lithium battery as the battery according to the first embodiment.

As shown in FIG. 1, a lithium battery 100 according to this embodiment includes a positive electrode 9 as a composite body including an electrolyte 3 and an active material 2b, a negative electrode 30 as an electrode provided on one side of the positive electrode 9 through an electrolyte layer 20, and a first current collector 41 as a current collector provided in contact with the other side of the positive electrode 9.

That is, the lithium battery 100 is a stacked body in which the first current collector 41, the positive electrode 9, the electrolyte layer 20, and the negative electrode 30 are sequentially stacked. In the electrolyte layer 20, a face which is in contact with the negative electrode 30 is defined as "one face 20a", and in the positive electrode 9, a face which is in contact with the first current collector 41 is defined as "surface 9a". For the electrolyte layer 20, a second current collector (not shown) may be provided as appropriate through the negative electrode 30, and the lithium battery 100 only needs to have a current collector which is in contact with at least one of the positive electrode 9 and the negative electrode 30.

Current Collector

For the first current collector 41 and the second current collector, any material can be suitably used as long as it is a forming material which does not cause an electrochemical reaction with the positive electrode 9 and the negative electrode 30, and has an electron conduction property. Examples of the forming material of the first current collector 41 and the second current collector include one type of metal (metal simple substance) selected from the group consisting of copper (Cu), magnesium (Mg), titanium (Ti), iron (Fe), cobalt (Co), nickel (Ni), zinc (Zn), aluminum (Al), germanium (Ge), indium (In), gold (An), platinum (Pt), silver (Ag), and palladium (Pd), alloys containing one or more types of metal elements selected from the above-mentioned group, electrically conductive metal oxides such as ITO (Tin-doped Indium Oxide), ATO (Antimony-doped Tin Oxide), and FTO (Fluorine-doped Tin Oxide), and metal nitrides such as titanium nitride (TiN), zirconium nitride (ZrN), and tantalum nitride (TaN).

As the form of the first current collector 41 and the second current collector, other than a thin film of the above-mentioned forming material having an electron conduction property, an appropriate form such as a metal foil, a plate shape, a mesh-like shape, a lattice-like shape, or a paste obtained by kneading an electrically conductive fine powder together with a binder can be selected according to the intended purpose. The thickness of such a first current collector 41 and a second current collector is not particularly limited, but is, for example, about 20 μm. The formation of the first current collector 41 and the second current collector may be performed after forming the positive electrode 9, the negative electrode 30, and the like, or may be performed before forming such members.

Negative Electrode

Examples of a negative electrode active material (forming material) contained in the negative electrode 30 include niobium pentoxide ($Nb_2O_5$), vanadium pentoxide ($V_2O_5$), titanium oxide ($TiO_2$), indium oxide ($In_2O_3$), zinc oxide (ZnO), tin oxide ($SnO_2$), nickel oxide (NiO), ITO (Tin-doped Indium Oxide), ATO (Antimony-doped Tin Oxide), FTO (Fluorine-doped Tin Oxide), aluminum (Al)-doped zinc oxide (AZO), gallium (Ga)-doped zinc oxide (GZO), the anatase phase of $TiO_2$, lithium composite oxides such as $Li_4Ti_5O_{12}$ and $Li_2Ti_3O_7$, metals and alloys such as lithium (Li), silicon (Si), tin (Sn), a silicon-manganese alloy (Si—Mn), a silicon-cobalt alloy (Si—Co), a silicon-nickel alloy (Si—Ni), indium (In), and gold (Au), a carbon material, and a material obtained by intercalation of lithium ions between layers of a carbon material.

The thickness of the negative electrode 30 is preferably from approximately about 50 nm to 100 μm, but can be arbitrarily designed according to a desired battery capacity or material properties.

The lithium battery 100 has, for example, a circular disk shape, and the size of the outer shape thereof is such that the diameter is about 10 mm and the thickness is about 150 μm. In addition to being small and thin, the lithium battery 100 can be charged and discharged, and is capable of obtaining a large output energy, and therefore can be suitably used as a power supply source (power supply) for a portable information terminal or the like. The shape of the lithium battery 100 is not limited to a circular disk shape, and may be, for example, a polygonal disk shape. Such a thin lithium battery 100 may be used alone or a plurality of lithium batteries 100 may be stacked and used. In the case of stacking the lithium batteries 100, in the lithium battery 100, the first current collector 41 and the second current collector are not necessarily essential components, and a configuration in which one of the current collectors is included may be adopted.

Figure 2:
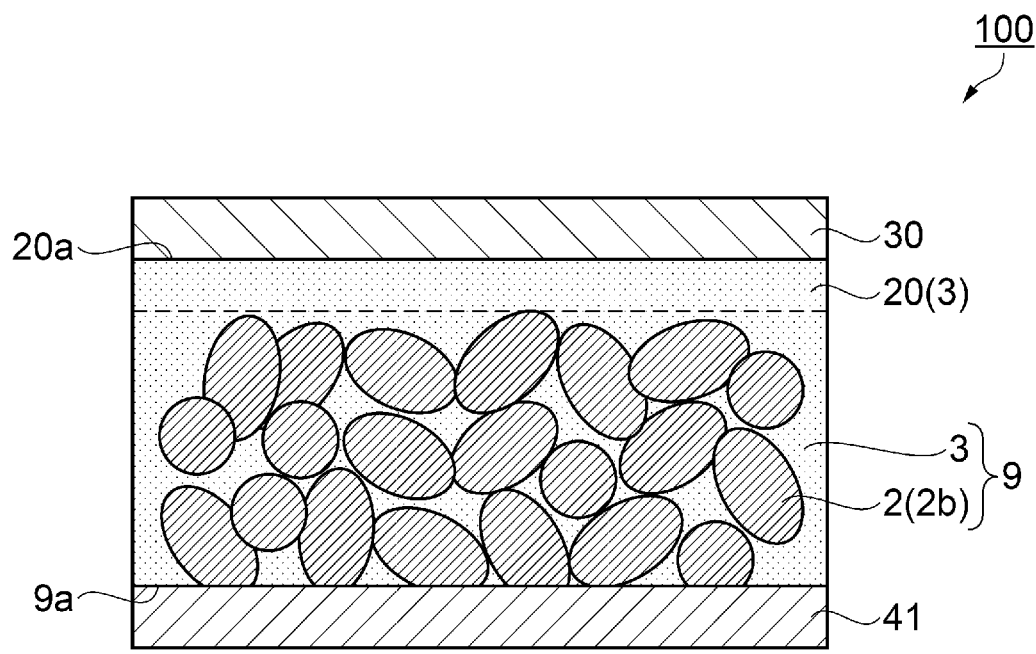
FIG. 2 is a schematic cross-sectional view showing a structure of the lithium battery.

Next, the structures of the positive electrode 9, the electrolyte layer 20, and the like included in the lithium battery 100 will be described with reference to FIG. 2. FIG. 2 is a schematic cross-sectional view showing the structure of the lithium battery.

The electrolyte layer 20 includes the electrolyte 3, and the positive electrode 9 includes the active material 2b and the electrolyte 3. The active material 2b is in the form of particles, and a plurality of particles of the active material 2b gather to form an active material portion 2 having a plurality of pores among the active material 2b in the form of particles.

Positive Electrode

The plurality of pores of the active material portion 2 in the positive electrode 9 communicate with one another like a mesh inside the active material portion 2. Further, by the contact between the active materials 2b, an electron conduction property of the active material portion 2 is ensured. The electrolyte 3 is provided so as to fill up the plurality of pores of the active material portion 2 and further cover the entire active material portion 2. That is, the active material portion 2 and the electrolyte 3 are combined to forma composite body (positive electrode 9). Therefore, as compared with the case where the active material portion 2 does not have a plurality of pores or the case where the electrolyte 3 is not provided inside the pores, the contact area between the active material 2b and the electrolyte 3 becomes large. Due to this, the interfacial resistance is decreased, and it becomes possible to achieve favorable charge transfer at the interface between the active material portion 2 and the electrolyte 3.

As in the lithium battery 100 of this embodiment, in the case where the first current collector 41 is used on the positive electrode 9 side, a lithium composite metal compound which is a positive electrode active material containing lithium (Li) is used as the active material 2b (active material portion 2). FIG. 2 is a view schematically showing the active material 2b, and the particle diameter and size of each active material 2b are not necessarily the same as the actual ones.

The lithium composite metal compound to be used as the positive electrode active material refers to a compound such as an oxide, which contains lithium and also contains two or more types of metal elements as a whole, and in which the existence of oxoacid ions is not observed.

Examples of the lithium composite metal compound include composite metal compounds containing lithium (Li) and also containing one or more types of elements selected from vanadium (V), chromium (Cr), manganese (Mn), iron (Fe), cobalt (Co), nickel (Ni), and copper (Cu). Such a composite metal compound is not particularly limited, however, specific examples thereof include $LiCoO_2$, $LiNiO_2$, $LiMn_2O_4$, $Li_2Mn_2O_3$, $LiCr_{0.5}Mn_{0.5}O_2$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, $Li_2MnSiO_4$, NMC ($Li_a(Ni_xMn_yCo_{1-x-y})O_2$), and NCA ($Li(Ni_xCo_yAl_{1-x-y})O_2$). Further, in this embodiment, solid solutions obtained by substituting some of the atoms in a crystal of any of these lithium composite metal compounds with another transition metal, typical metal, alkali metal, alkaline rare earth metal, lanthanoid, chalcogenide, halogen, or the like are also included in the lithium composite metal compound, and any of these solid solutions can also be used as the positive electrode active material.

By using the lithium composite metal compound as the active material 2b in the forming material of the active material portion 2, electron transfer is performed between the particles of the active material 2b, and lithium ion transfer is performed between the active material 2b and the electrolyte 3. According to this, the function as the active material portion 2 can be favorably exhibited.

The active material portion 2 has a bulk density of preferably 50% or more and 90% or less, more preferably 50% or more and 70% or less. When the active material portion 2 has such a bulk density, the surface area of the inside of the pore of the active material portion 2 is enlarged, and the contact area between the active material portion 2 and the electrolyte 3 is easily increased. According to this, in the lithium battery 100, it becomes easier to increase the capacity than in the related art.

When the above-mentioned bulk density is denoted by β (%), the apparent volume including the pores of the active material portion 2 is denoted by v, the mass of the active material portion 2 is denoted by w, and the density of the particles of the active material 2b is denoted by ρ, the following mathematical formula (a) is established. According to this, the bulk density can be determined.

$$\beta = \{w/(v \cdot \rho)\} \times 100 \qquad (a)$$

In order to control the bulk density of the active material portion 2 to fall within the above range, the average particle diameter (median diameter) of the active material 2b is preferably set to 0.3 μm or more and 10 μm or less, and is more preferably 0.5 μm or more and 5 μm or less. The average particle diameter of the active material 2b can be measured by, for example, dispersing the active material 2b in n-octyl alcohol at a concentration within a range of 0.1 mass % or more and 10 mass % or less, and determining the median diameter using a light scattering particle size distribution analyzer, Nanotrac (trademark) UPA-EX250 (product name, MicrotracBEL Corporation).

The bulk density of the active material portion 2 may also be controlled by using a pore forming material in the step of forming the active material portion 2.

The resistivity of the active material portion 2 is preferably 700 Ω·cm or less. When the active material portion 2 has such a resistivity, a sufficient output can be obtained in the lithium battery 100. The resistivity can be determined by adhering a copper foil as an electrode to the surface of the active material portion 2, and performing DC polarization measurement.

In the active material portion 2, the plurality of pores communicate with one another like a mesh inside, and also the active material portions 2 are connected to one another to form a mesh-like structure. For example, $LiCoO_2$, which is a positive electrode active material, is known to have anisotropy in the electron conduction property in a crystal. Due to this, in a structure in which pores extend in a specific direction such that the pores are formed by machining, the electron conduction property may be decreased depending on the direction of the electron conduction property in a crystal. On the other hand, in this embodiment, the active material portion 2 has a mesh-like structure, and therefore, an electrochemically active continuous surface can be formed regardless of the anisotropy in the electron conduction property or ion conduction property in a crystal. Due to this, a favorable electron conduction property can be ensured regardless of the type of the forming material to be used.

In the positive electrode 9, the contained amount of the binder (binding agent) for binding the active materials 2b or the pore forming material for adjusting the bulk density of the active material portion 2 is preferably reduced as much as possible. When the binder or the pore forming material remains in the active material portion 2 (positive electrode 9), such a component may sometimes adversely affect the electrical characteristics, and therefore, it is necessary to remove the component by carefully performing heating in a post-process. Specifically, in this embodiment, the mass loss percentage in the case where the positive electrode 9 is heated at 400° C. for 30 minutes is set to 5 mass % or less. The mass loss percentage is preferably 3 mass % or less, more preferably 1 mass % or less, and further more preferably, the mass loss is not observed or is within the measurement error range. When the mass loss percentage of the positive electrode 9 is within such a range, the amount of a solvent or adsorbed water which is evaporated, an organic substance which is vaporized by combustion or oxidation under a predetermined heating condition, or the like is reduced. According to this, the electrical characteristics (charge-discharge characteristics) of the lithium battery 100 can be further improved.

The mass loss percentage of the positive electrode 9 can be determined from the values of the mass of the positive electrode 9 before and after heating under a predetermined heating condition using a thermal gravimetric-differential thermal analyzer (TG-DTA).

In the lithium battery 100, a direction away from the first current collector 41 in the normal direction (the upper side of FIG. 2) is defined as "upward direction", the surface on the upper side of the positive electrode 9 is in contact with the electrolyte layer 20. The surface 9a on the lower side of the positive electrode 9 is in contact with the first current collector 41. In the positive electrode 9, the upper side in contact with the electrolyte layer 20 is "one side", and the lower side in contact with the first current collector 41 is "the other side".

On the surface 9a of the positive electrode 9, the active material portion 2 is exposed. Therefore, the active material portion 2 and the first current collector 41 are provided in contact with each other and both are electrically connected to each other. The electrolyte 3 is also provided inside the pores of the active material portion 2 and is in contact with the surface of the active material portion 2 including the inside of the pores of the active material portion 2 other than the face in contact with the first current collector 41. In the positive electrode 9 having such a configuration, due to the contact area between the first current collector 41 and the active material portion 2, the contact area between the active material portion 2 and the electrolyte 3 is increased. Due of this, the interface between the active material portion 2 and the electrolyte 3 hardly becomes a bottleneck of charge transfer, and therefore, favorable charge transfer is easily ensured as the positive electrode 9, and thus, it is possible to achieve high capacity and high output in the lithium battery 100 using the positive electrode 9.

Electrolyte

Figure 3:
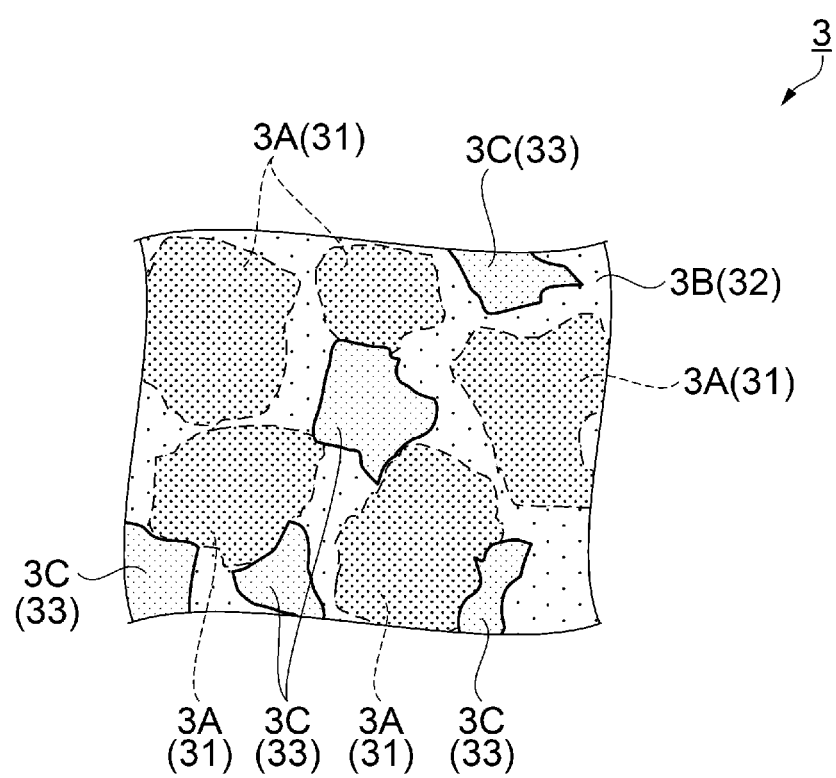
FIG. 3 is a schematic view showing a structure of an electrolyte.

Next, the structure of the electrolyte 3 included in the positive electrode 9 will be described with reference to FIG. 3. FIG. 3 is a schematic view showing the structure of the electrolyte.

The electrolyte 3 includes a first electrolyte portion 31, in which one or more types of elements among the elements constituting a crystalline lithium composite metal oxide represented by the following compositional formula (1) are substituted with a first metal element having a crystal radius of 78 pm (picometers) or more, an amorphous second electrolyte portion 32, which contains lithium (Li) and one or more types of second metal elements contained in the first electrolyte portion 31 other than lithium (Li), and an amorphous third electrolyte portion 33, which contains lithium (Li) and is in contact with the first electrolyte portion 31 and the second electrolyte portion 32.

$$Li_7(La_{3-x}Nd_x)Zr_2O_{12} \quad (1)$$

In the formula (1), x satisfies the following formula: $0.0 < x \leq 0.6$.

In the first electrolyte portion 31, lanthanum (La) is partially substituted with neodymium (Nd) as shown in the compositional formula (1). Therefore, as compared with the case where lanthanum (La) is not partially substituted with neodymium (Nd), the tetragonal-cubic phase transition temperature (phase transition temperature) of the first electrolyte portion 31 is lowered, so that the crystal after transition to the cubic phase easily grows at a lower temperature. The phase transition from the tetragonal phase to the cubic phase is generally secondary transition accompanied by a small heat absorption and is caused by temperature and heat quantity required for the phase transition. Further, by Raman scattering analysis or evaluation of lithium ion conduction property, it has already been known that in a tetragonal crystal, the movement of lithium is restricted, however, in a cubic crystal, lithium easily moves and the lithium ion conduction property is improved.

Specifically, as shown in FIG. 3, the electrolyte 3 includes a first portion 3A including the first electrolyte portion 31, a second portion 3B including the second electrolyte portion 32, and a third portion 3C including the third electrolyte portion 33. The third portion 3C communicates with itself inside the electrolyte 3.

The structure of such an electrolyte 3 can be confirmed, for example, with a transmission electron microscope or the like. In the electrolyte 3 of this embodiment, the boundary between the first portion 3A and the second portion 3B is not always clear. The concentration of one or more types of metal elements contained in the first electrolyte portion 31 and the second electrolyte portion 32 continuously changes between the first portion 3A and the second portion 3B, and the concentration gradient of the metal elements exists. Therefore, the boundary between the first portion 3A and the second portion 3B is in an ambiguous state.

This concentration gradient is derived from a difference in ease of entry of the first metal element into the crystal lattice in the crystalline lithium composite metal oxide of the above compositional formula (1). That is, from the first electrolyte portion 31 to the second electrolyte portion 32, the concentration of a metal element whose ease of entry described above is high gradually decreases, and the concentration of a metal element whose ease of entry described above is low gradually increases. In other words, among the first metal elements, the metal element whose ease of entry described above is low becomes the second metal element and forms the second electrolyte portion 32 along with lithium (Li) and the like contained in the first electrolyte portion 31. Therefore, in order to generate such a concentration gradient, two or more types of first metal elements are used when forming the first electrolyte portion 31 and the second electrolyte portion 32.

FIG. 3 is a view schematically illustrating a state by observation of the structure using a transmission electron microscope with respect to the structure of such an electrolyte 3, and does not necessarily coincide with the actual state.

Here, in the lithium battery 100 of this embodiment, the third electrolyte portion 33 is not necessarily essential. That is, the electrolyte 3 may be formed from the first electrolyte portion 31 and the second electrolyte portion 32 without using the third electrolyte portion 33.

The first electrolyte portion 31 preferably contains a crystalline lithium composite metal oxide represented by the following compositional formula (2), in which zirconium (Zr) in the lithium composite metal oxide represented by the above compositional formula (1) is partially substituted with the first metal element.

$$Li_{7-y}(La_{3-x}Nd_x)(Zr_{2-y}M_y)O_{12} \quad (2)$$

In the formula (2), x and y satisfy the following formulae: $0.0<x\leq0.6$ and $0.1\leq y\leq1.0$, and M represents the first metal element.

According to this, an excellent lithium ion conduction property can be exhibited. Further, in the compositional formula (2), y is 0.1 or more, and therefore, the second electrolyte portion 32 is easily formed. Since y is 1.0 or less, generation of an oxide of only the metal element is suppressed, and the lithium ion conduction property can be further improved.

Examples of the first metal element having a crystal radius of 78 pm or more include magnesium (Mg), scandium (Sc), strontium (Sr), yttrium (Y), niobium (Nb), molybdenum (Mo), indium (In), antimony (Sb), tellurium (Te), barium (Ba), cerium (Ce), praseodymium (Pr), neodymium (Nd), hafnium (Hf), tantalum (Ta), lead (Pb), and bismuth (Bi). Among these, the first electrolyte portion 31 preferably contains one or more types of niobium (Nb), antimony (Sb), and tantalum (Ta), each of which is easily substituted for zirconium (Zr), has an excellent effect of improving the lithium ion conduction property, etc. As for the crystal radius of each of these elements, according to a crystal and molecular structure design program, CrystalMaker (registered trademark) (Hulinks, Inc.), the crystal radius of niobium (Nb) is 78 pm, the crystal radius of antimony (Sb) is 90 pm, and the crystal radius of tantalum (Ta) is 78 pm. Other than these, a metal element capable of forming a garnet-type crystal or a garnet-like-type crystal may be used.

The second electrolyte portion 32 is an amorphous material formed using the lithium composite metal oxide contained in the first electrolyte portion 31 described above, and contains one or more types of niobium (Nb), antimony (Sb), and tantalum (Ta) as the second metal element, and lithium (Li), lanthanum (La), and zirconium (Zr).

As the forming material of the third electrolyte portion 33, a solid electrolyte having a lower melting point than the melting points of the active material 2b, the first electrolyte portion 31, and the second electrolyte portion 32 may be used. Specific examples thereof include oxides, halides, hydrides, and borides such as $LiBH_4$ (268° C.), LiF (848° C.), LiCl (605° C.), LiBr (552° C.), LiI (469° C.), $Li_3BO_3$ (817° C.), and $Li_{2+x}C_{1-x}B_xO_3$ (0.01<x<0.5) (680° C. to 750° C.), and amorphous and partially crystallized glasses of partially substituted materials thereof. The temperature in parentheses after each compound name described above is the melting point of the compound. Among these, it is preferred to use a solid electrolyte containing lithium (Li), boron (B), and oxygen (O), and it is more preferred to use a solid electrolyte containing lithium (Li), boron (B), carbon (C), and oxygen (O). According to this, the amorphous third electrolyte portion 33 is easily formed, and the lithium ion conduction property of the electrolyte 3 can be further improved.

Further, a solid solution obtained by substituting some of the atoms of any of the above-mentioned compounds with another transition metal, typical metal, alkali metal, alkaline rare earth metal, lanthanoid, chalcogenide, halogen, or the like may also be used as the forming material of the third electrolyte portion 33. Among the above-mentioned solid electrolytes, one type may be used alone or two or more types may be used in admixture.

In this embodiment, as the forming material of the third electrolyte portion 33, $Li_{2+x}C_{1-x}B_xO_3$ (0.01<x<0.5) is used. Specific examples thereof include $Li_{2.2}C_{0.8}B_{0.2}O_3$. By using the above-mentioned forming material in the third electrolyte portion 33, the occurrence of dendrites due to segregation of lithium is suppressed, and a composite body (positive electrode 9) having a dense structure is formed. According to this, the lithium ion conduction property in the positive electrode 9 can be further improved.

The total ion conductivity as the index of the lithium ion conduction property of the electrolyte 3 is preferably $2.0\times10^{-4}$ S/cm or more. When the electrolyte 3 has such an ion conductivity, an ion contained in the electrolyte 3 at a position away from the surface of the active material portion 2 easily reaches the surface of the active material portion 2. Due to this, also the ion can contribute to the battery reaction in the active material portion 2, and the capacity of the lithium battery 100 can be further increased.

Here, the ion conductivity of the electrolyte 3 refers to a grain bulk conductivity as the conductivity of the electrolyte 3 itself, and in the case where the electrolyte 3 is a crystalline material, a grain boundary conductivity as the conductivity between crystal grains, and a total ion conductivity which is the sum of these conductivities. Further, the index of the grain boundary resistance in the electrolyte 3 is a grain boundary conductivity, and when the grain boundary conductivity increases, the grain boundary resistance decreases. The measurement method for the ion conductivity of the electrolyte 3 will be described later.

Electrolyte Layer

Going back to FIG. 2, the electrolyte layer 20 is provided between the positive electrode 9 and the negative electrode 30 as described above. The electrolyte layer 20 includes the electrolyte 3, but does not include the active material 2b. In the electrolyte layer 20, the same electrolyte 3 as that of the positive electrode 9 described above can be used. By interposing the electrolyte layer 20 which does not include the active material 2b between the positive electrode 9 and the negative electrode 30, the positive electrode 9 and the negative electrode 30 are hardly electrically connected to each other, and the occurrence of a short circuit is suppressed. The positive electrode 9 and the electrolyte layer 20 each include the electrolyte 3, and therefore, the electrolytes 3 of the positive electrode 9 and the electrolyte layer 20 may be formed simultaneously at the time of production. That is, in the production step of the lithium battery 100, the formation of the active material portion 2 and the formation of the electrolyte layer 20 may be performed at a time. Further, the electrolyte layer 20 may be formed using a different forming material from that of the electrolyte 3. In such a case, the positive electrode 9 and the electrolyte layer 20 are formed in separate production steps.

The thickness of the electrolyte layer 20 is preferably 0.1 μm or more and 100 μm or less, more preferably 0.2 μm or more and 10 μm or less. By setting the thickness of the electrolyte layer 20 within the above range, the internal resistance of the electrolyte layer 20 is decreased, and the occurrence of a short circuit between the positive electrode 9 and the negative electrode 30 can be suppressed.

On the one face 20a (the face in contact with the negative electrode 30) of the electrolyte layer 20, a relief structure such as a trench, a grating, or a pillar may be provided by combining various molding methods and processing methods as needed.

Method for Producing Battery

Figure 4:
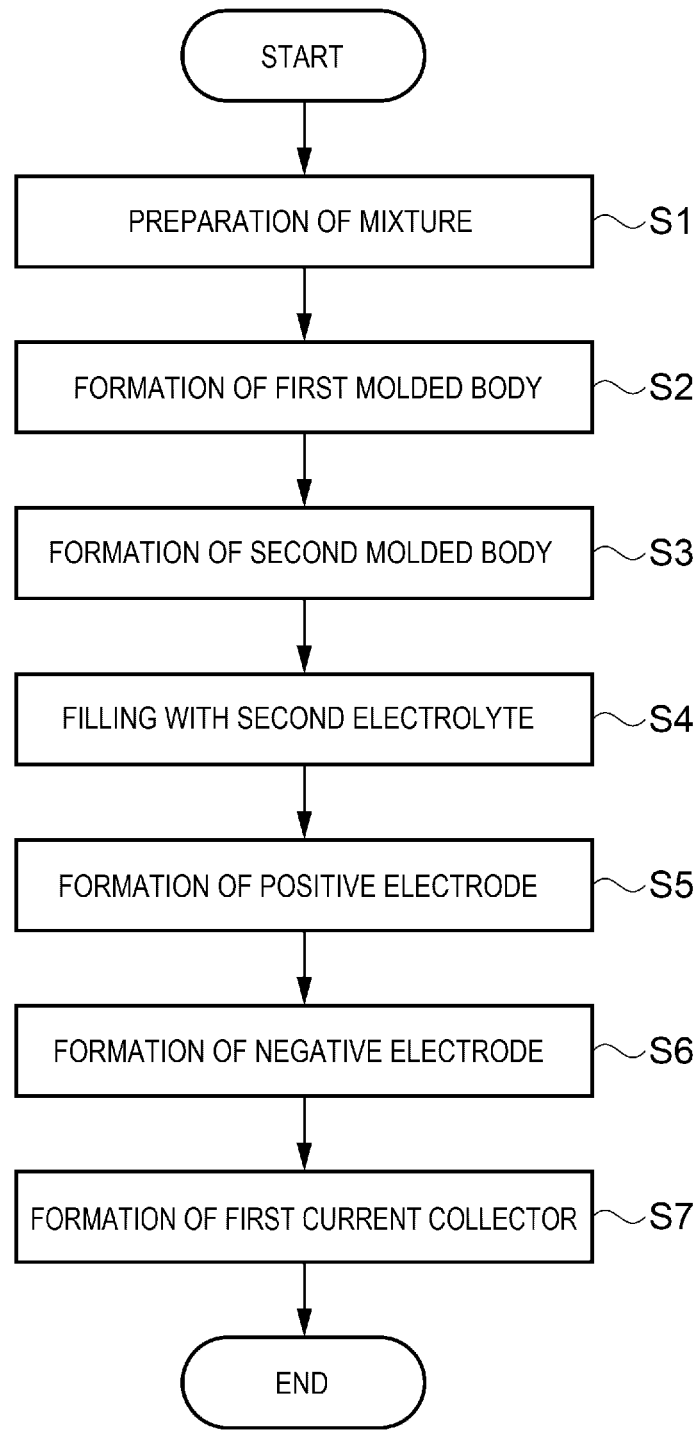
FIG. 4 is a process flowchart showing a method for producing a lithium battery.

A method for producing the lithium battery 100 as the battery according to this embodiment will be described with reference to FIGS. 4, 5A, 5B, 5C, and 5D. FIG. 4 is a process flowchart showing the method for producing the lithium battery. FIGS. 5A to 5D are schematic views each showing the method for producing the lithium battery. The process flow shown in FIG. 4 is an example, and the method is not limited thereto.

As shown in FIG. 4, the method for producing the lithium battery 100 according to this embodiment includes the following steps. In a step S1, a mixture is prepared by dissolving a plurality of types of raw materials containing elements constituting a crystalline lithium composite metal oxide represented by the following compositional formula (1) and a first metal element having a crystal radius of 78 pm or more, respectively, in a solvent, followed by mixing. In a step S2, an active material portion 2 as a first molded body is formed using an active material 2b. In a step S3, a second molded body which includes a crystalline first electrolyte portion 31 and an amorphous second electrolyte portion 32 obtained after a reaction, and the active material portion 2 by subjecting the mixture to a heating treatment in a state of being impregnated into the active material portion 2 to cause a reaction. In a step S4, the second molded body is filled with the melt of a third electrolyte 33a containing lithium (Li), boron (B), and oxygen (O) by melting the third electrolyte 33a by heating in a state where the third electrolyte 33a is brought into contact with the second molded body. In a step S5, a positive electrode 9 which includes the first electrolyte portion 31, the second electrolyte portion 32, a third electrolyte portion 33, and the active material portion 2 (active material 2b) is formed by cooling the second molded body filled with the melt of the third electrolyte 33a. In a step S6, a negative electrode is formed on one side of the positive electrode through an electrolyte layer 20. In a step S7, a first current collector 41 is formed on the other side (a surface 9a) of the positive electrode 9.

$$Li_7(La_{3-x}Nd_x)Zr_2O_{12} \tag{1}$$

In the formula (1), x satisfies the following formula: $0.0 < x \leq 0.6$.

Here, the method for producing the lithium battery 100 includes a method for producing the first electrolyte portion 31 and the second electrolyte portion 32 of the electrolyte 3 of this embodiment. That is, the method for producing the first electrolyte portion 31 and the second electrolyte portion 32 of this embodiment includes a step of preparing a mixture by mixing a plurality of types of raw materials containing elements constituting a crystalline lithium composite metal oxide represented by the above compositional formula (1) and a first metal element, respectively, and a step of forming the crystalline first electrolyte portion 31 and the amorphous second electrolyte portion 32 by subjecting the mixture to a heating treatment. These steps are included in the step S1 and the step S3 in the method for producing the lithium battery 100 described above. The method for producing the first electrolyte portion 31 and the second electrolyte portion 32 of this embodiment will be described by exemplifying a liquid phase method.

Preparation of Mixture

In the step S1, a mixture is prepared by dissolving each of the precursors as the raw materials of the first electrolyte portion 31 and the second electrolyte portion 32 in a solvent to form solutions, followed by mixing these solutions. That is, the mixture contains a solvent for dissolving the above-mentioned raw materials (precursors). As the precursors of the first electrolyte portion 31 and the second electrolyte portion 32, metal compounds containing the elements constituting the lithium composite metal oxide represented by the above compositional formula (1) and a metal compound containing the first metal element are used.

As the metal compounds containing the elements constituting the lithium composite metal oxide represented by the above compositional formula (1), a lithium compound, a lanthanum compound, a neodymium compound, and a zirconium compound are used. The types of these compounds are not particularly limited, but each compound is preferably one or more types of metal salts or metal alkoxides of lithium, lanthanum, neodymium, or zirconium.

Examples of the lithium compound include lithium metal salts such as lithium chloride, lithium nitrate, lithium acetate, lithium hydroxide, and lithium carbonate, and lithium alkoxides such as lithiummethoxide, lithium ethoxide, lithium propoxide, lithium isopropoxide, lithium n-butoxide, lithium isobutoxide, lithium sec-butoxide, lithium tert-butoxide, and lithium dipivaloylmethanate, and one or more types selected from this group can be adopted.

Examples of the lanthanum compound include lanthanum metal salts such as lanthanum chloride, lanthanum nitrate, and lanthanum acetate, and lanthanum alkoxides such as lanthanum trimethoxide, lanthanum triethoxide, lanthanum tripropoxide, lanthanum triisopropoxide, lanthanum tri-n-butoxide, lanthanum triisobutoxide, lanthanum tri-sec-butoxide, lanthanum tri-tert-butoxide, and lanthanum tris(dipivaloylmethanate), and one or more types selected from this group can be adopted.

Examples of the neodymium compound include neodymium metal salts such as neodymium bromide, neodymium chloride, neodymium fluoride, neodymium oxalate, neodymium acetate, neodymium nitrate, neodymium sulfate, neodymium trimethacrylate, neodymium tris (acetylacetonate), and neodymium tri-2-ethylhexanoate, and neodymium alkoxides such as triisopropoxyneodymium and trimethoxyethoxyneodymium, and one or more types selected from this group can be adopted.

Examples of the zirconium compound include zirconium metal salts such as zirconium chloride, zirconium oxychloride, zirconium oxynitrate, zirconium oxyacetate, and zirconium acetate, and zirconium alkoxides such as zirconium tetramethoxide, zirconium tetraethoxide, zirconium tetrapropoxide, zirconium tetraisopropoxide, zirconium tetra-n-butoxide, zirconium tetraisobutoxide, zirconium tetra-sec-butoxide, zirconium tetra-tert-butoxide, and zirconium tetrakis(dipivaloylmethanate), and one or more types selected from this group can be adopted.

As the metal compound containing a metal element having a crystal radius of 78 pm or more, a niobium compound, an antimony compound, a tantalum compound, or the like is used. The type of these compounds is not particularly limited, but is preferably one or more types of metal salts or metal alkoxides of each of niobium, antimony, tantalum, and the like.

Examples of the niobium compound include niobium metal salts such as niobium chloride, niobium oxychloride, niobium oxalate, niobium triacetylacetonate, and niobium pentaacetylacetonate, and niobium alkoxides such as niobium pentaethoxide, niobium pentapropoxide, niobium pentaisopropoxide, and niobium penta-sec-butoxide, and one or more types selected from this group can be adopted.

Examples of the antimony compound include antimony metal salts such as antimony bromide, antimony chloride, and antimony fluoride, and antimony alkoxides such as antimony trimethoxide, antimony triethoxide, antimony triisopropoxide, antimony tri-n-propoxide, antimony triisobutoxide, and antimony tri-n-butoxide, and one or more types selected from this group can be adopted.

Examples of the tantalum compound include tantalum metal salts such as tantalum chloride and tantalum bromide, and tantalum alkoxides such as tantalum pentamethoxide, tantalum pentaethoxide, tantalum pentapropoxide, tantalum penta-n-propoxide, tantalum pentaisobutoxide, tantalum penta-n-butoxide, tantalum penta-sec-butoxide, and tantalum penta-tert-butoxide, and one or more types selected from this group can be adopted.

As the solvent contained in the solution which contains the precursors of the first electrolyte portion 31 and the second electrolyte portion 32, a single solvent of water or an organic solvent or a mixed solvent capable of dissolving the above-mentioned metal salt or metal alkoxide is used. The organic solvent is not particularly limited, however, examples thereof include alcohols such as methyl alcohol, ethyl alcohol, n-propyl alcohol, isopropyl alcohol, n-butyl alcohol, allyl alcohol, and ethylene glycol monobutyl ether (2-butoxyethanol), glycols such as ethylene glycol, propylene glycol, butylene glycol, hexylene glycol, pentanediol, hexanediol, heptanediol, and dipropylene glycol, ketones such as dimethyl ketone, methyl ethyl ketone, methyl propyl ketone, and methyl isobutyl ketone, esters such as methyl formate, ethyl formate, methyl acetate, and methyl acetoacetate, ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether, organic acids such as formic acid, acetic acid, 2-ethylbutyric acid, and propionic acid, aromatics such as toluene, o-xylene, and p-xylene, and amides such as formamide, N,N-dimethylformamide, N,N-diethylformamide, dimethylacetamide, and N-methylpyrrolidone.

By dissolving each of the precursors of the first electrolyte portion 31 and the second electrolyte portion 32 described above in any of the above-mentioned solvents, a plurality of solutions containing each of the precursors of the first electrolyte portion 31 and the second electrolyte portion 32 are prepared. Subsequently, a mixture is prepared by mixing the plurality of solutions. At this time, in addition to lithium, lanthanum, neodymium, and zirconium, one or more types of niobium, antimony, and tantalum are incorporated in the mixture at a predetermined ratio according to the compositions of the first electrolyte portion 31 and the second electrolyte portion 32. At this time, the mixture may be prepared by mixing the precursors, and then dissolving the mixed precursors in a solvent without preparing the plurality of solutions containing each of the precursors.

Lithium in the composition is sometimes volatilized by heating in a post-process. Therefore, the lithium compound may be blended excessively in advance so that the content of the lithium compound in the mixture is increased by about 0.05 mol % to 30 mol % with respect to the desired composition according to the heating condition.

Figure 5A:
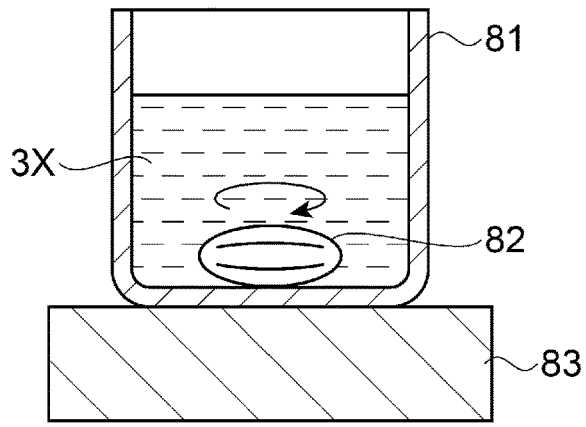
FIG. 5A is a schematic view showing the method for producing a lithium battery.

In the preparation of the mixture, specifically, for example, as shown in FIG. 5A, the plurality of solutions containing each of the precursors of the first electrolyte portion 31 and the second electrolyte portion 32 are added to a beaker 81 made of Pyrex. A magnetic stirrer bar 82 is added thereto, and the solutions are mixed while stirring by a magnetic stirrer 83. By doing this, a mixture 3X is obtained. Then, the process proceeds to the step S2.

Formation of First Molded Body

Figure 5B:
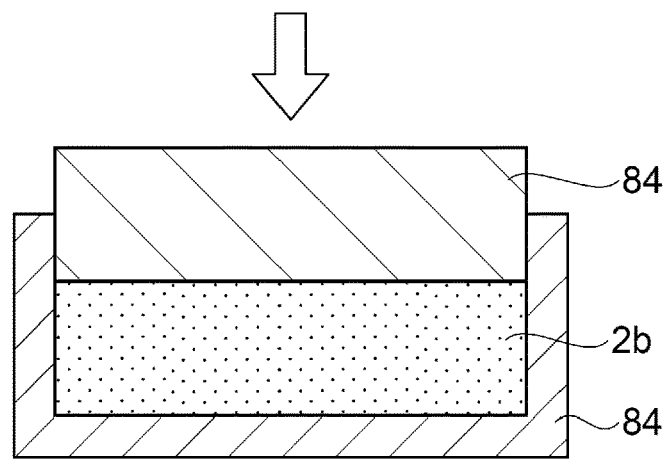
FIG. 5B is a schematic view showing the method for producing a lithium battery.

In the step S2, the active material portion 2 as the first molded body is formed. In this embodiment, as a forming material (active material 2b) of the active material portion 2, $LiCoO_2$ which is a lithium composite metal compound is used. First, the particles of $LiCoO_2$ (Sigma-Aldrich Co., Ltd.) are subjected to a classification operation in n-butanol (butanol) using a wet-type centrifuge model LC-1000 (product name, Krettek Separation GmbH), whereby the active material 2b having an average particle diameter of about 5 µm is obtained. Subsequently, as shown in FIG. 5B, the active material 2b is compression molded using a molding die 84. Specifically, a powder of $LiCoO_2$ is pressed at a pressure of 624 MPa for 2 minutes using the molding die 84 (a die with an exhaust port having an inner diameter of 10 mm), whereby a disk-shaped molded material (diameter: 10 mm, effective diameter: 8 mm, thickness: 150 µm) of $LiCoO_2$ (active material 2b) is produced.

Thereafter, the molded material of the active material 2b is placed on a substrate and subjected to a heat treatment at 900° C. over 8 hours, whereby the active material portion 2 is obtained. By this heat treatment, the particles of the active material 2b are sintered to one another, and the shape of the molded material is easily retained. Further, the active materials 2b are brought into contact with each other and bound to each other, whereby an electron transfer pathway is formed. The forming material of the substrate is not particularly limited, however, it is preferred to use a material which hardly reacts with the active material 2b and the electrolyte 3, and for example, magnesium oxide or the like is exemplified.

The temperature of the heat treatment is preferably, for example, a temperature which is 850° C. or higher and is lower than the melting point of the active material 2b. According to this, the active materials 2b are sintered to one another, whereby the active material portion 2 which is an integrated porous material is obtained. By setting the temperature of the heat treatment to 850° C. or higher, sintering proceeds sufficiently, and also the electron conduction property in the crystal of the active material 2b is ensured. By setting the temperature of the heat treatment lower than the melting point of the active material 2b, excessive volatilization of lithium ions in the crystal of the active material 2b is suppressed, and the lithium ion conduction property is maintained. Due to this, it becomes possible to ensure the electrical capacity of the positive electrode 9. The temperature of the heat treatment is more preferably 875° C. or higher and 1000° C. or lower. According to this, in the lithium battery 100 using the positive electrode 9, appropriate output and capacity can be provided.

The time of the heat treatment is preferably set to, for example, 5 minutes or more and 36 hours or less, and is more preferably 4 hours or more and 14 hours or less. By the above-mentioned treatment, the active material portion 2 having a plurality of pores is obtained. Then, the process proceeds to the step S3.

Formation of Second Molded Body

In the step S3, the mixture 3X prepared in the step S1 is brought into contact with the active material portion 2 and impregnated into the active material portion 2, and then, a heating treatment is performed, and by the reaction of the mixture 3X, the crystalline first electrolyte portion 31 and the amorphous second electrolyte portion 32 are produced. In this manner, the first electrolyte portion 31 and the second electrolyte portion 32 are formed on the surface including the inside of the plurality of pores of the active material portion 2, whereby the second molded body is obtained.

Figure 5C:
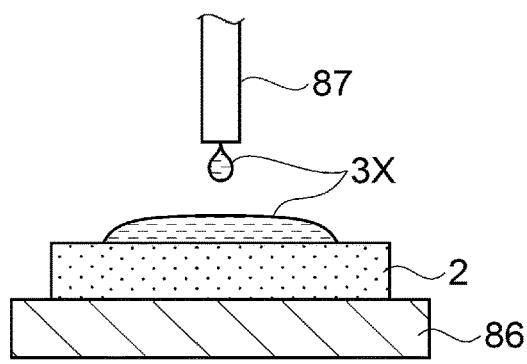
FIG. 5C is a schematic view showing the method for producing a lithium battery.

First, the mixture 3X and the active material portion 2 are brought into contact with each other and the mixture 3X is impregnated into the active material portion 2. Specifically, as shown in FIG. 5C, the active material portion 2 is placed on a substrate 86. The substrate 86 is made of, for example, magnesium oxide.

Subsequently, the mixture 3X is applied to the surface of the active material portion 2 including the inside of the pores of the active material portion 2 using a micropipette 87 or the like. At this time, the application amount of the mixture 3X is adjusted so that the bulk density of the produced second molded body is approximately about 75% or more and 85% or less. In other words, the application amount of the mixture 3X is adjusted so that about half the volume of the voids (pores) of the active material portion 2 is filled with the first electrolyte portion 31 and the second electrolyte portion 32. The bulk density of the second molded body can be obtained in the same manner as the bulk density of the active material portion 2 described above.

As the method for applying the mixture 3X, other than dropping using the micropipette 87, for example, a method such as immersion, spraying, penetration by capillary phenomenon, or spin coating can be used, and these methods may be performed in combination. The mixture 3X has fluidity, and therefore also easily reaches the inside of the pores of the active material portion 2 by capillary phenomenon. The mixture 3X is applied so as to wet and spread on the entire surface including the inside of the pores of the active material portion 2.

In the case where the electrolyte layer 20 is formed from the same forming material as that of the electrolyte 3, the mixture may be excessively applied to one face of the active material portion 2. By performing the below-mentioned heating treatment in this state, the active material portion 2 is completely sunk in the first electrolyte portion 31 and the second electrolyte portion 32, and the electrolyte layer 20 is formed.

Subsequently, the mixture 3X impregnated into the active material portion 2 is subjected to a heating treatment. The heating treatment includes a first heating treatment in which the heating temperature is 500° C. or higher and 650° C. or lower, and a second heating treatment which is performed after the first heating treatment, and in which the heating temperature is 800° C. or higher and 1000° C. or lower. By the first heating treatment, the solvent contained in the mixture 3X or an organic substance such as an impurity is decomposed and reduced. Therefore, in the second heating treatment, the purity is increased, so that the reaction is accelerated, and the first electrolyte portion 31 and the second electrolyte portion 32 can be formed. Further, by setting the temperature of the heating treatment to 1000° C. or lower, the occurrence of a side reaction at the crystal grain boundary or volatilization of lithium can be suppressed. Accordingly, the lithium ion conduction property can be further improved. The heating treatment may be performed in a dry atmosphere, an oxidizing atmosphere, an inert gas atmosphere, or the like. As a method for the heating treatment, for example, the heating treatment is performed using an electric muffle furnace or the like.

Subsequently, the mixture is gradually cooled to room temperature after the heating treatment. The reaction in the mixture 3X proceeds by the heating treatment, and by the cooling thereafter, the crystalline first electrolyte portion 31 containing the lithium composite metal oxide, in which zirconium is partially substituted with at least one of niobium, antimony, and tantalum, and which is represented by the above compositional formula (2), and the amorphous second electrolyte portion 32 are formed. That is, as the formation of the crystalline first electrolyte portion 31, the amorphous second electrolyte portion 32 is formed from the residue which did not contribute to the formation of the first electrolyte portion 31.

At this time, with respect to the lithium composite metal oxide represented by the above compositional formula (2), there is a difference in ease of entry into the crystal lattice among niobium, antimony, and tantalum. Due to this difference, the concentration gradient of niobium, antimony, and tantalum occurs at the boundary between the first portion 3A and the second portion 3B (see FIG. 3 for both) described above. That is, on the first portion 3A side, the concentration of a metal element which easily enters the crystal lattice is high, and on the second portion 3B side, the concentration of a metal element which hardly enters the crystal lattice is high.

Among niobium, antimony, and tantalum, niobium has the highest ease of entry into (most easily enters) the crystal lattice, and antimony has the second highest ease of entry into the crystal lattice, and tantalum hardly enters the crystal lattice. For example, in the case where two types: niobium and antimony are used when the first electrolyte portion 31 and the second electrolyte portion 32 are formed, in the first portion 3A (first electrolyte portion 31), the concentration of niobium is high, but on the contrary, in the second portion 3B (second electrolyte portion 32), the concentration of antimony is high. In the case where antimony and tantalum are used, in the first portion 3A, the concentration of antimony is high, and in the second portion 3B, the concentration of tantalum is high. Further, in the case where three types: niobium, antimony, and tantalum are used, in the first portion 3A (first electrolyte portion 31), the concentration of niobium is high, but on the contrary, in the second portion 3B (second electrolyte portion 32), the concentrations of antimony and tantalum are high.

Such ease of entry into the crystal lattice depends on the size of the crystal radius and the magnitude of penetration energy in the zirconium site of a metal element. Therefore, in order to form the crystalline first electrolyte portion 31 and the amorphous second electrolyte portion 32 in a state where the boundary therebetween is ambiguous, metal compounds containing at least two types of metal elements each having a crystal radius of 78 pm or more and also having a mutually different penetration energy in the zirconium site as the first metal elements, respectively, are used.

Accordingly, the second molded body in which the active material portion 2, the first electrolyte portion 31, and the second electrolyte portion 32 are combined is obtained. The second molded body has a bulk density of approximately about 75% or more and 85% or less and has a plurality of pores. In this embodiment, the first electrolyte portion 31 and the second electrolyte portion 32 are formed using a liquid phase method, however, the method is not limited thereto. The first electrolyte portion 31, the second electrolyte portion 32, and the like may be formed using a solid phase method. Then, the process proceeds to the step S4.

Filling with Third Electrolyte

In the step S4, the melt of the third electrolyte $33a$ containing the forming materials of the third electrolyte portion 33 is filled in the pores of the second molded body. In this embodiment, as the third electrolyte $33a$, $Li_{2.2}C_{0.8}B_{0.2}O_3$ (hereinafter also referred to as "LCBO") is used. First, the particles (powder) of LCBO are produced. Specifically, for example, $Li_2CO_3$ and $Li_3BO_3$ are mixed at a molar mixing ratio of 4:1, and the resulting mixture is pressed into a tablet at a pressure of 30 MPa for 2 minutes using the molding die 84 used in the step S2. Thereafter, the tablet is placed in a high-temperature furnace and fired at 650° C. for 4 hours, whereby a solid material of LCBO is produced. This solid material is ground using a dry mill or the like, whereby LCBO particles (particles of the third electrolyte $33a$) as the powder form are obtained.

Here, the melting point of the produced LCBO particles was measured using a thermal gravimetric-differential thermal analyzer TG-DTA 2000SA (product name, Bruker AXS GmbH), and as a result, it was about 685° C. The measurement conditions for the melting point will be described in Examples. The method for producing the third electrolyte 33a in the form of particles is not limited to the above-mentioned method, and a known method can be adopted.

Figure 5D:
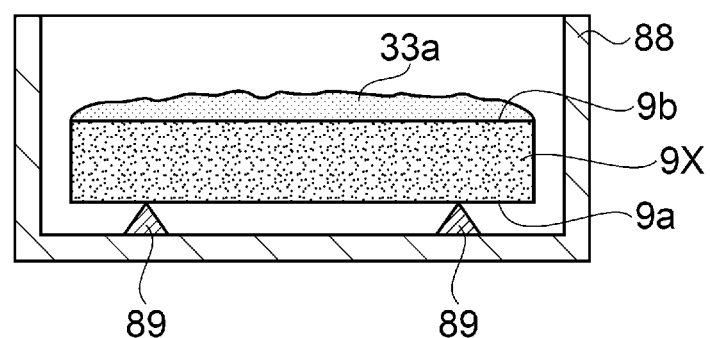
FIG. 5D is a schematic view showing the method for producing a lithium battery.

Subsequently, the melt of the third electrolyte 33a is impregnated into the second molded body. Specifically, as shown in FIG. 5D, the second molded body 9X is placed in a pot 88 through a support 89. Further, the third electrolyte 33a in the form of particles is placed on the upper face 9b (ceiling face) of the second molded body 9X.

The pot 88 is made of, for example, magnesium oxide, and the support 89 is made of, for example, gold (Au). In this embodiment, a face (lower face) opposed to the upper face 9b of the second molded body 9X is a surface 9a of the positive electrode 9 (see FIG. 1).

The mass of the third electrolyte 33a to be placed on the upper face 9b is preferably set not less than a mass sufficient for filling up the plurality of pores of the second molded body 9X. Further, the upper face 9b may be defined as a face under which the active material portion 2 is completely sunk in the first electrolyte portion 31 and the second electrolyte portion 32. According to this, the electrolyte layer 20 can be formed simultaneously with the positive electrode 9 by adjusting the mass. In such a case, the upper face 9b becomes one face 20a of the electrolyte layer 20. In this embodiment, the positive electrode 9 and the electrolyte layer 20 are formed simultaneously.

In the above-mentioned state, the third electrolyte 33a in the form of particles alone or the whole including the third electrolyte 33a in the form of particles and the second molded body 9X is heated. The heating temperature at this time can be arbitrarily set as long as the heating temperature is higher than the melting point of the third electrolyte 33a and lower than the melting point of the first electrolyte portion 31. In this embodiment, the heating temperature is set to 700° C. Examples of a heating method include an electric muffle furnace and laser annealing. A molded pellet is produced from the third electrolyte 33a in the form of particles, and this molded pellet may be placed on the second molded body 9X and then heated.

The third electrolyte 33a is melted and transformed into a melt by being heated to a temperature above the melting point of the third electrolyte 33a. The melt covers the entire second molded body 9X while penetrating the inside of the pores from the upper face 9b of the second molded body 9X.

Here, the method for filling the third electrolyte 33a in the second molded body 9X is not limited to the above-mentioned method in which the melt of the third electrolyte 33a is penetrated. Examples of other forming methods include immersion, dropping, spraying, penetration by capillary phenomenon, and spin coating using a solution containing the precursors of the third electrolyte 33a, and by performing heating in a post-process, removal of the solvent in the solution and firing of the third electrolyte 33a may be performed. Then, the process proceeds to the step S5.

Formation of Positive Electrode

In the step S5, the melt of the third electrolyte 33a and the second molded body 9X are allowed to cool, whereby the melt of the third electrolyte 33a is solidified. At this time, the melt of the third electrolyte 33a is solidified in a state where the melt is in contact with the first electrolyte portion 31 and the second electrolyte portion 32 provided on the surface of the active material portion 2 in the second molded body 9X. In this manner, the positive electrode 9 in which the active material portion 2, the first electrolyte portion 31, the second electrolyte portion 32, and the third electrolyte portion 33 are combined is formed.

The electrolyte 3 may be formed from the first electrolyte portion 31 and the second electrolyte portion 32 without using the third electrolyte portion 33. In such a case, the voids of the second molded body 9X are filled by repeatedly performing the step S3, whereby the composite body (positive electrode 9) is formed. Then, the process proceeds to the step S6.

Formation of Negative Electrode

In the step S6, the negative electrode 30 is formed on one face 20a side of the electrolyte layer 20. As a method for forming the negative electrode 30, other than a solution process such as a so-called sol-gel method or an organometallic thermal decomposition method involving a hydrolysis reaction or the like of an organometallic compound, a CVD method using an appropriate metal compound and an appropriate gas atmosphere, an ALD method, a green sheet method or a screen printing method using a slurry of solid electrolyte particles, an aerosol deposition method, a sputtering method using an appropriate target and an appropriate gas atmosphere, a PLD method, a vacuum deposition method, plating, thermal spraying, or the like can be used. As a forming material of the negative electrode 30, the above-mentioned negative electrode active material can be adopted, and in this embodiment, lithium (Li) metal is used. Then, the process proceeds to the step S7.

Formation of First Current Collector

In the step S7, first, the face (lower face) opposed to the face (one face 20a) on which the electrolyte layer 20 is formed of the positive electrode 9 is polished. At this time, by a polishing process, the active material portion 2 is reliably exposed to form the surface 9a. By doing this, electrical connection between the active material portion 2 and the first current collector 41 to be formed thereafter can be ensured. In the case where the active material portion 2 is sufficiently exposed on the lower face side of the positive electrode 9 in the above-mentioned step, this polishing process may be omitted.

Subsequently, the first current collector 41 is formed on the surface 9a. Examples of a method for forming the first current collector 41 include a method in which an appropriate adhesive layer is separately provided to adhere the first current collector 41, a gas phase deposition method such as a PVD (Physical Vapor Deposition) method, a CVD (Chemical Vapor Deposition) method, a PLD (Pulsed Laser Deposition) method, an ALD (Atomic Layer Deposition) method, and an aerosol deposition method, and a wet method such as a sol-gel method, an organometallic thermal decomposition method, and plating, and an appropriate method can be used according to the reactivity with the face on which the first current collector 41 is formed, an electrical conduction property desired for the electrical circuit, and the design of the electrical circuit. Further, as a forming material of the first current collector 41, the above-mentioned forming material can be adopted. By undergoing the above-mentioned steps, the lithium battery 100 is produced.

As described above, by the electrolyte 3, the method for producing the electrolyte 3, the lithium battery 100, and the method for producing the lithium battery 100 according to the above-mentioned embodiment, the following effects can be obtained.

According to the electrolyte 3, the crystalline first electrolyte portion 31 and the amorphous second electrolyte portion 32 are included, and therefore, as compared with the case where the electrolyte 3 is constituted by only a crystalline material and the first electrolyte portions 31 are joined to each other, a resistance occurring at the crystal interface of the first electrolyte portion 31 is decreased. In addition, in the first electrolyte portion 31, the phase transition temperature from the tetragonal phase to the cubic phase is lowered. Therefore, the crystal of the first electrolyte portion 31 grows at a lower temperature than in the related art. Accordingly, even if firing is performed at a lower temperature than in the related art, the stabilization of the crystal (cubic crystal) in the first electrolyte portion 31 is promoted, and thus, the lithium ion conduction property of the electrolyte 3 can be improved.

The first electrolyte portion 31 is a crystalline lithium composite metal oxide having the above compositional formula (1) as a basic structure, and by using such a garnet-type crystal or a garnet-like-type crystal as the first electrolyte portion 31, the bulk lithium ion conductivity (grain bulk conductivity) can be improved in the electrolyte 3. In addition, a reducing reaction by lithium metal hardly occurs, and therefore, the stability of the electrolyte 3 can also be improved.

Zirconium (Zr) of the first electrolyte portion 31 is partially substituted with one or more types of metal elements among niobium (Nb), antimony (Sb), and tantalum (Ta), and therefore, the concentration gradient of one or more types of metal elements among niobium (Nb), antimony (Sb), and tantalum (Ta) occurs from the first electrolyte portion 31 to the second electrolyte portion 32. That is, from the first electrolyte portion 31 containing the first metal element to the second electrolyte portion 32 containing the second metal element, the concentration of a metal element whose ease of entry into the crystal lattice is high gradually decreases, and the concentration of a metal element whose ease of entry described above is low gradually increases. According to this configuration, the boundary between the first electrolyte portion 31 and the second electrolyte portion 32 gets into an ambiguous state, and ion diffusion is promoted. Due to this, as compared with the case where the boundary is clear, the grain boundary resistance is decreased, and the lithium ion conduction property can be further improved. In addition, the metal element having a crystal radius of 78 pm or more such as niobium (Nb), antimony (Sb), or tantalum (Ta) hardly falls off from the first electrolyte portion 31 even by firing at a relatively high temperature, and a stable lithium ion conduction property can be obtained.

By using the third electrolyte portion 33, the first electrolyte portion 31 is joined to the second electrolyte portion 32 and the third electrolyte portion 33, and therefore, the resistance occurring at the crystal interface of the first electrolyte portion 31 is further decreased. In addition, the lithium ion conduction property of the electrolyte 3 can be further improved. Further, by using LCBO as the forming material of the third electrolyte portion 33, the amorphous third electrolyte portion 33 is easily formed.

According to the method for producing the electrolyte 3 or the lithium battery 100, the first electrolyte portion 31 and the second electrolyte portion 32 can be formed in the same step. Specifically, the amorphous second electrolyte portion 32 is formed in a state of being joined to the first electrolyte portion 31 from the raw materials which do not contribute to the formation of the crystalline first electrolyte portion 31. Accordingly, the concentration gradient of the metal element occurs between the first electrolyte portion 31 containing the first metal element and the second electrolyte portion 32 containing the second metal element, and the boundary between the first electrolyte portion 31 and the second electrolyte portion 32 becomes ambiguous. Further, the first electrolyte portion 31 and the second electrolyte portion 32 are formed in the same step, and therefore, the production step of the electrolyte 3 or the lithium battery 100 can be simplified.

Since a liquid phase method is used, the crystal grain of the first electrolyte portion 31 is crystallized from the solution of the mixture 3X. Therefore, as compared with a solid phase method, the micronization of the crystal grain is facilitated. Further, by the first heating treatment (500° C. or higher and 650° C. or lower), the solvent contained in the mixture 3X or an organic substance such as an impurity is decomposed and reduced. Therefore, in the second heating treatment (800° C. or higher and 1000° C. or lower), the purity is increased, so that the reaction is accelerated, and the first electrolyte portion 31 and the second electrolyte portion 32 can be formed. Further, by setting the temperature of the heating treatment to 1000° C. or lower, the occurrence of a side reaction at the crystal grain boundary or volatilization of lithium can be suppressed. Accordingly, the electrolyte 3 or the lithium battery 100 in which the lithium ion conduction property is further improved can be produced.

In the inside of the pores including the surface of the first molded body which includes the active material portion 2 (active material 2b), the first electrolyte portion 31 and the second electrolyte portion 32 are formed by a liquid phase method, whereby the second molded body 9X is produced. Further, in the inside of the pores including the surface of the second molded body 9X, the melt of the third electrolyte 33a is filled, whereby the positive electrode 9 is formed. Therefore, the active material portion 2 is in contact with the first electrolyte portion 31 and the second electrolyte portion 32, and thus, the positive electrode 9 is formed such that the first electrolyte portion 31, the second electrolyte portion 32, and the third electrolyte portion 33 are in contact with one another. The positive electrode 9 having such a configuration can be easily produced, and also the grain boundary resistance of the electrolyte 3 can be decreased by the configuration.

According to the lithium battery 100, the electrolyte 3 in which the grain boundary resistance is decreased and the lithium ion conduction property is improved is used, and therefore, the charge-discharge characteristics of the lithium battery 100 can be improved. Further, as the active material 2b, a positive electrode active material containing lithium (Li) is used, and therefore, the charge-discharge characteristics can be further improved, and also the capacity of the lithium battery 100 can be increased.

Next, the effects of the above-mentioned embodiment will be more specifically described by showing Examples and Comparative Examples with respect to a solid electrolyte as the electrolyte according to the above-mentioned embodiment. FIG. 6 is a table showing the compositions of solid electrolytes according to Examples and Comparative Examples. In the weight measurement in the following experiment, the weight was measured to the first decimal place using an analytical balance ME204T (Mettler Toledo International, Inc.).

EXAMPLES AND COMPARATIVE EXAMPLES

Preparation of Metal Compound Solutions

First, by using a lithium compound, a lanthanum compound, a neodymium compound, a zirconium compound, a niobium compound, an antimony compound, a tantalum compound, and a solvent, the following metal compound solutions were prepared as metal element sources containing the metal compounds, respectively.

2-Butoxyethanol Solution of 1 mol/kg Lithium Nitrate

In a 30-g reagent bottle made of Pyrex (trademark of Corning Incorporated) equipped with a magnetic stirrer bar, 1.3789 g of lithium nitrate (Kanto Chemical Co., Inc., 3N5)

with a purity of 99.95% and 18.6211 g of 2-butoxyethanol (ethylene glycol monobutyl ether) (Kanto Chemical Co., Inc., Cica Special Grade) were weighed. Then, the bottle was placed on a magnetic stirrer with a hot plate function, and lithium nitrate was completely dissolved in 2-butoxyethanol while stirring at 190° C. for 1 hour. The resulting solution was gradually cooled to room temperature (about 20° C.), whereby a 2-butoxyethanol solution of 1 mol/kg lithium nitrate was obtained. The purity of lithium nitrate can be measured using an ion chromatography-mass spectrometer.

2-Butoxyethanol Solution of 1 mol/kg Lanthanum Nitrate Hexahydrate

In a 30-g reagent bottle made of Pyrex equipped with a magnetic stirrer bar, 8.6608 g of lanthanum nitrate hexahydrate (Kanto Chemical Co., Inc., 4N) and 11.3392 g of 2-butoxyethanol were weighed. Then, the bottle was placed on a magnetic stirrer with a hot plate function, and lanthanum nitrate hexahydrate was completely dissolved in 2-butoxyethanol while stirring at 140° C. for 30 minutes. The resulting solution was gradually cooled to room temperature, whereby a 2-butoxyethanol solution of 1 mol/kg lanthanum nitrate hexahydrate was obtained.

2-Butoxyethanol Solution of 1 mol/kg Neodymium Nitrate, Hydrous

In a 20-g reagent bottle made of Pyrex equipped with a magnetic stirrer bar, 4.2034 g of neodymium nitrate, hydrous (n=5, Kojundo Chemical Laboratory Co., Ltd., 4N) and 5.7966 g of 2-butoxyethanol were weighed. Then, the bottle was placed on a magnetic stirrer with a hot plate function, and neodymium nitrate, hydrous (n=5) was completely dissolved in 2-butoxyethanol while stirring at 140° C. for 30 minutes. The resulting solution was gradually cooled to room temperature, whereby a 2-butoxyethanol solution of 1 mol/kg neodymium nitrate, hydrous (n=5) was obtained. The hydration number n of the used neodymium nitrate, hydrous was 5 from the result of mass loss by a combustion experiment.

Butanol Solution of 1 mol/kg Zirconium Tetra-n-Butoxide

In a 20-g reagent bottle made of Pyrex equipped with a magnetic stirrer bar, 3.8368 g of zirconium tetra-n-butoxide (Wako Pure Chemical Industries, Ltd.) and 6.1632 g of butanol (n-butanol) were weighed. Then, the bottle was placed on a magnetic stirrer, and zirconium tetra-n-butoxide was completely dissolved in butanol while stirring at room temperature for 30 minutes, whereby a butanol solution of 1 mol/kg zirconium tetra-n-butoxide was obtained.

2-Butoxyethanol Solution of 1 mol/kg Niobium Pentaethoxide

In a 20-g reagent bottle made of Pyrex equipped with a magnetic stirrer bar, 3.1821 g of niobium pentaethoxide (Wako Pure Chemical Industries, Ltd.) and 6.8179 g of 2-butoxyethanol were weighed. Then, the bottle was placed on a magnetic stirrer, and niobium pentaethoxide was completely dissolved in 2-butoxyethanol while stirring at room temperature for 30 minutes, whereby a 2-butoxyethanol solution of 1 mol/kg niobium pentaethoxide was obtained.

2-Butoxyethanol Solution of 1 mol/kg Antimony tri-n-Butoxide

In a 20-g reagent bottle made of Pyrex equipped with a magnetic stirrer bar, 3.4110 g of antimony tri-n-butoxide (Wako Pure Chemical Industries, Ltd.) and 6.5890 g of 2-butoxyethanol were weighed. Then, the bottle was placed on a magnetic stirrer, and antimony tri-n-butoxide was completely dissolved in 2-butoxyethanol while stirring at room temperature for 30 minutes, whereby a 2-butoxyethanol solution of 1 mol/kg antimony tri-n-butoxide was obtained.

2-Butoxyethanol Solution of 1 mol/kg Tantalum penta-n-Butoxide

In a 20-g reagent bottle made of Pyrex equipped with a magnetic stirrer bar, 5.4640 g of tantalum penta-n-butoxide (Kojundo Chemical Lab. Co., Ltd.) and 4.5360 g of 2-butoxyethanol were weighed. Then, the bottle was placed on a magnetic stirrer, and tantalum penta-n-butoxide was completely dissolved in 2-butoxyethanol while stirring at room temperature for 30 minutes, whereby a 2-butoxyethanol solution of 1 mol/kg tantalum penta-n-butoxide was obtained.

Preparation of Mixture

Subsequently, in Examples and Comparative Examples, according to the compositions of the first electrolyte portion and the second electrolyte portion shown in FIG. 6, solutions containing the precursors of the first electrolyte portion and the second electrolyte portion as mixtures were prepared.

Solution Containing Precursors of $Li_{6.9}La_{2.95}Nd_{0.05}Zr_{1.9}Nb_{0.05}Sb_{0.05}O_{12}$ of Examples 1 and 2

In Examples 1 and 2, a solution containing the precursors of $Li_{6.9}La_{2.95}Nd_{0.05}Zr_{1.9}Nb_{0.05}Sb_{0.05}O_{12}$ was prepared. First, in a glass beaker, 8.2800 g of the 2-butoxyethanol solution of 1 mol/kg lithium nitrate, 2.9500 g of the 2-butoxyethanol solution of 1 mol/kg lanthanum nitrate hexahydrate, 0.0500 g of the 2-butoxyethanol solution of 1 mol/kg neodymium nitrate, hydrous (n=5), 1.9000 g of the butanol solution of 1 mol/kg zirconium tetra-n-butoxide, 0.0500 g of the 2-butoxyethanol solution of 1 mol/kg niobium pentaethoxide, and 0.0500 g of the 2-butoxyethanol solution of 1 mol/kg antimony tri-n-butoxide were weighed, and a magnetic stirrer bar was placed therein. Subsequently, stirring was performed at room temperature for 30 minutes using a magnetic stirrer, whereby a mixture of Examples 1 and 2 was obtained.

Solution Containing Precursors of $Li_{6.9}La_{2.95}Nd_{0.05}Zr_1Ta_{0.3}Sb_{0.7}O_{12}$ of Examples 3 and 4

In Examples 3 and 4, a solution containing the precursors of $Li_{6.9}La_{2.95}Nd_{0.05}Zr_1Ta_{0.3}Sb_{0.7}O_{12}$ was prepared. First, in a glass beaker, 8.2800 g of the 2-butoxyethanol solution of 1 mol/kg lithium nitrate, 2.9500 g of the 2-butoxyethanol solution of 1 mol/kg lanthanum nitrate hexahydrate, 0.0500 g of the 2-butoxyethanol solution of 1 mol/kg neodymium nitrate, hydrous (n=5), 1.0000 g of the butanol solution of 1 mol/kg zirconium tetra-n-butoxide, 0.3000 g of the 2-butoxyethanol solution of 1 mol/kg tantalum penta-n-butoxide, and 0.7000 g of the 2-butoxyethanol solution of 1 mol/kg antimony tri-n-butoxide were weighed, and a magnetic stirrer bar was placed therein. Subsequently, stirring was performed at room temperature for 30 minutes using a magnetic stirrer, whereby a mixture of Examples 3 and 4 was obtained.

Solution Containing Precursors of $Li_6La_{2.4}Nd_{0.6}Zr_1Nb_{0.3}Ta_{0.7}O_{12}$ of Examples 5 and 6

In Examples 5 and 6, a solution containing the precursors of $Li_6La_{2.4}Nd_{0.6}Zr_1Nb_{0.3}Ta_{0.7}O_{12}$ was prepared. First, in a glass beaker, 7.2000 g of the 2-butoxyethanol solution of 1 mol/kg lithium nitrate, 2.4000 g of the 2-butoxyethanol solution of 1 mol/kg lanthanum nitrate hexahydrate, 0.6000 g of the 2-butoxyethanol solution of 1 mol/kg neodymium nitrate, hydrous (n=5), 1.0000 g of the butanol solution of 1 mol/kg zirconium tetra-n-butoxide, 0.3000 g of the 2-butoxyethanol solution of 1 mol/kg niobium pentaethoxide, and 0.7000 g of the 2-butoxyethanol solution of 1 mol/kg tantalum penta-n-butoxide were weighed, and a magnetic stirrer bar was placed therein. Subsequently, stirring was performed at room temperature for 30 minutes using a magnetic stirrer, whereby a mixture of Examples 5 and 6 was obtained.

Solution Containing Precursors of $Li_{6.9}La_{2.4}Nd_{0.6}Zr_{1.9}Nb_{0.05}Sb_{0.05}O_{12}$ of Examples 7 and 8

In Examples 7 and 8, a solution containing the precursors of $Li_{6.9}La_{2.4}Nd_{0.6}Zr_{1.9}Nb_{0.15}Sb_{0.05}O_{12}$ was prepared. First, in a glass beaker, 8.2800 g of the 2-butoxyethanol solution of 1 mol/kg lithium nitrate, 2.4000 g of the 2-butoxyethanol solution of 1 mol/kg lanthanum nitrate hexahydrate, 0.6000 g of the 2-butoxyethanol solution of 1 mol/kg neodymium nitrate, hydrous (n=5), 1.9000 g of the butanol solution of 1 mol/kg zirconium tetra-n-butoxide, 0.0500 g of the 2-butoxyethanol solution of 1 mol/kg niobium pentaethoxide, and 0.0500 g of the 2-butoxyethanol solution of 1 mol/kg antimony tri-n-butoxide were weighed, and a magnetic stirrer bar was placed therein. Subsequently, stirring was performed at room temperature for 30 minutes using a magnetic stirrer, whereby a mixture of Examples 7 and 8 was obtained.

Solution Containing Precursors of $Li_{6.2}La_{2.94}Nd_{0.06}Zr_{1.2}Ta_{0.4}Sb_{0.4}O_{12}$ of Examples 9 and 10

In Examples 9 and 10, a solution containing the precursors of $Li_{6.2}La_{2.94}Nd_{0.06}Zr_{1.2}Ta_{0.4}Sb_{0.4}O_{12}$ was prepared. First, in a glass beaker, 7.4400 g of the 2-butoxyethanol solution of 1 mol/kg lithium nitrate, 2.9400 g of the 2-butoxyethanol solution of 1 mol/kg lanthanum nitrate hexahydrate, 0.0600 g of the 2-butoxyethanol solution of 1 mol/kg neodymium nitrate, hydrous (n=5), 1.2000 g of the butanol solution of 1 mol/kg zirconium tetra-n-butoxide, 0.4000 g of the 2-butoxyethanol solution of 1 mol/kg tantalum penta-n-butoxide, and 0.4000 g of the 2-butoxyethanol solution of 1 mol/kg antimony tri-n-butoxide were weighed, and a magnetic stirrer bar was placed therein. Subsequently, stirring was performed at room temperature for 30 minutes using a magnetic stirrer, whereby a mixture of Examples 9 and 10 was obtained.

Solution Containing Precursors of $Li_{6.3}La_{2.95}Nd_{0.05}Zr_{1.3}Ta_{0.2}Sb_{0.5}O_{12}$ of Example 11

In Example 11, a solution containing the precursors of $Li_{6.3}La_{2.95}Nd_{0.05}Zr_{1.3}Ta_{0.2}Sb_{0.5}O_{12}$ was prepared. First, in a glass beaker, 7.5600 g of the 2-butoxyethanol solution of 1 mol/kg lithium nitrate, 2.9500 g of the 2-butoxyethanol solution of 1 mol/kg lanthanum nitrate hexahydrate, 0.0500 g of the 2-butoxyethanol solution of 1 mol/kg neodymium nitrate, hydrous (n=5), 1.3000 g of the butanol solution of 1 mol/kg zirconium tetra-n-butoxide, 0.2000 g of the 2-butoxyethanol solution of 1 mol/kg tantalum penta-n-butoxide, and 0.5000 g of the 2-butoxyethanol solution of 1 mol/kg antimony tri-n-butoxide were weighed, and a magnetic stirrer bar was placed therein. Subsequently, stirring was performed at room temperature for 30 minutes using a magnetic stirrer, whereby a mixture of Example 11 was obtained.

Solution Containing Precursors of $Li_7La_{2.4}Nd_{0.6}Zr_2O_{12}$ of Comparative Example 1

In Comparative Example 1, a solution containing the precursors of $Li_7La_{2.4}Nd_{0.6}Zr_2O_{12}$ was prepared. First, in a glass beaker, 8.4000 g of the 2-butoxyethanol solution of 1 mol/kg lithium nitrate, 2.4000 g of the 2-butoxyethanol solution of 1 mol/kg lanthanum nitrate hexahydrate, 0.6000 g of the 2-butoxyethanol solution of 1 mol/kg neodymium nitrate, hydrous (n=5), and 2.0000 g of the butanol solution of 1 mol/kg zirconium tetra-n-butoxide were weighed, and a magnetic stirrer bar was placed therein. Subsequently, stirring was performed at room temperature for 30 minutes using a magnetic stirrer, whereby a mixture of Comparative Example 1 was obtained.

Solution Containing Precursors of $Li_{6.5}La_3Zr_{1.5}Nb_{0.25}Sb_{0.25}O_{12}$ of Comparative Example 2

In Comparative Example 2, a solution containing the precursors of $Li_{6.5}La_3Zr_{1.5}Nb_{0.25}Sb_{0.25}O_{12}$ was prepared. First, in a glass beaker, 7.8000 g of the 2-butoxyethanol solution of 1 mol/kg lithium nitrate, 3.0000 g of the 2-butoxyethanol solution of 1 mol/kg lanthanum nitrate hexahydrate, 1.5000 g of the butanol solution of 1 mol/kg zirconium tetra-n-butoxide, 0.2500 g of the 2-butoxyethanol solution of 1 mol/kg niobium pentaethoxide, and 0.2500 g of the 2-butoxyethanol solution of 1 mol/kg antimony tri-n-butoxide were weighed, and a magnetic stirrer bar was placed therein. Subsequently, stirring was performed at room temperature for 30 minutes using a magnetic stirrer, whereby a mixture of Comparative Example 2 was obtained.

Solution Containing Precursors of $Li_{6.3}La_3Zr_{1.3}Ta_{0.2}Sb_{0.5}O_{12}$ of Comparative Example 3

In Comparative Example 3, a solution containing the precursors of $Li_{6.3}La_3Zr_{1.3}Ta_{0.2}Sb_{0.5}O_{12}$ was prepared. First, in a glass beaker, 7.5600 g of the 2-butoxyethanol solution of 1 mol/kg lithium nitrate, 3.0000 g of the 2-butoxyethanol solution of 1 mol/kg lanthanum nitrate hexahydrate, 1.3000 g of the butanol solution of 1 mol/kg zirconium tetra-n-butoxide, 0.2000 g of the 2-butoxyethanol solution of 1 mol/kg tantalum penta-n-butoxide, and 0.5000 g of the 2-butoxyethanol solution of 1 mol/kg antimony tri-n-butoxide were weighed, and a magnetic stirrer bar was placed therein. Subsequently, stirring was performed at room temperature for 30 minutes using a magnetic stirrer, whereby a mixture of Comparative Example 3 was obtained.

In the mixtures (the solutions containing the precursors) of Examples 1 to 11 and Comparative Examples 1 to 3, in consideration of the volatilization amount (release amount) of lithium by heating in a post-process, the 2-butoxyethanol solution of 1 mol/kg lithium nitrate was blended in an amount 1.2 times the molar ratio with respect to each of the predetermined theoretical compositions. The other metal compound solutions were blended in an equimolar ratio with respect to the theoretical compositions.

Production of Solid Electrolyte Pellet

Solid electrolyte pellets for evaluation are produced using the mixtures (the solutions containing the precursors) of Examples 1, 3, 5, 7, 9, and 11 and Comparative Examples 1, 2, and 3 prepared above. First, the solution containing the precursors is placed in a titanium dish having an inner diameter of 50 mm and a height of 20 mm. This dish is placed on a hot plate and heated for 1 hour by setting the set temperature of the hot plate to 180° C. to remove the solvent. Subsequently, the dish is heated for 30 minutes by setting the set temperature of the hot plate to 360° C. to decompose most of the contained organic components by combustion. Thereafter, the dish is heated for 1 hour by setting the set temperature of the hot plate to 540° C. to burn and decompose the remaining organic components. Thereafter, the dish is gradually cooled to room temperature on the hot plate, whereby a 540° C.-calcined body is obtained.

Subsequently, the 540° C.-calcined body is transferred to an agate mortar and sufficiently ground and mixed. A 0.2000-g portion is weighed out of the mortar and pressed at a pressure of 0.624 kN/mm$^2$ (624 MPa) for 5 minutes using a molding die (a die with an exhaust port having an inner diameter of 10 mm), whereby a 540° C.-calcined body pellet (a disk-shaped molded body of the 540° C.-calcined body) is produced. With respect to Example 11 and Comparative Example 3, only the below-mentioned thermal analysis (measurement of the phase transition temperature and the melting point) is performed, and therefore, a sample in a state where the 540° C.-calcined body is ground and mixed is used.

Then, the 540° C.-calcined body pellet is placed in a pot made of magnesium oxide, the pot is covered with a lid made of magnesium oxide, and then, the pellet is fired at 900° C. for 8 hours in an electric muffle furnace. Subsequently, the electric muffle furnace is gradually cooled to room temperature, and then, the pellet is taken out and used as a solid electrolyte pellet for evaluation having a diameter of about 9.5 mm and a thickness of about 800 μm.

The above operation was performed for the solutions containing the precursors of Examples and Comparative Examples, whereby the respective solid electrolyte pellets were produced. Since the first electrolyte portion and the second electrolyte portion of Examples 2, 4, 6, 8, and 10 have the same compositions as those of Examples 1, 3, 5, 7, and 9 respectively, the evaluation for those of Examples 2, 4, 6, 8, and 10 were omitted.

Evaluation of Solid Electrolyte

Lithium Ion Conduction Property

Figures 7, 8:
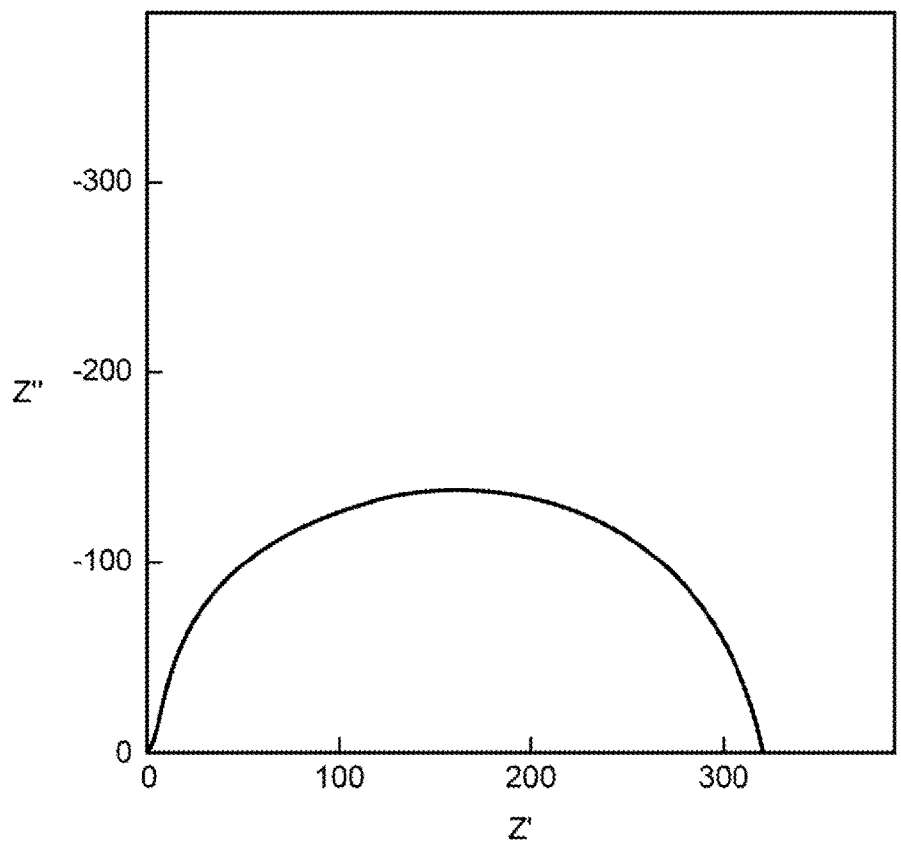
FIG. 7 is a table showing the evaluation results of lithium ion conductivities according to Examples and Comparative Examples.
FIG. 8 is a graph showing a Cole-Cole plot which is the impedance spectrum of Example 3.

With respect to each of the solid electrolyte pellets of Examples 1, 3, 5, 7, and 9 and Comparative Examples 1 and 2, as the index of the lithium ion conduction property, the lithium ion conductivity was evaluated by the following method, and the results are shown in FIG. 7.

A lithium electrode (non-ion blocking electrode) having a diameter of 8 mm was produced by lithium vapor deposition on both front and back faces of the solid electrolyte pellet. Subsequently, by using an impedance analyzer SI 1260 (Solartron, Inc.), AC impedance measurement was performed. In the measurement, the AC amplitude was set to 10 mV and the measurement frequency was set to $10^7$ Hz to $10^{-1}$ Hz. An explanation will be provided by using Example 3 as one example of a Cole-Cole plot which is the obtained impedance spectrum. FIG. 8 is a graph showing a Cole-Cole plot which is the impedance spectrum of a sample in which a lithium electrode (non-ion blocking electrode) having a diameter of 8 mm was formed by lithium vapor deposition on both front and back faces of the solid electrolyte pellet of Example 3. In FIG. 8, the horizontal axis represents the real component of the impedance (Z') and the vertical axis represents the imaginary component of the impedance (Z"). In the impedance spectrum (Cole-Cole plot) of each of Examples 1, 3, 5, 7, and 9, and Comparative Examples 1 and 2, the grain bulk component and the grain boundary component were integrated and could not be separated. Therefore, only the total ion conductivity was calculated and is shown in FIG. 7.

The lithium ion conduction property will be described with reference to FIG. 7. FIG. 7 is a table showing the evaluation results of the lithium ion conductivities according to Examples and Comparative Examples. In Examples and Comparative Examples for which the evaluation was performed, the grain bulk component and the grain boundary component were integrated and could not be separated as described above. Therefore, in the columns of the grain bulk component and the grain boundary component in FIG. 7, the symbol "-" is entered. That is, it was shown that at such a level, the grain boundary resistance is decreased. Further, in Examples, a total ion conductivity of $2.0 \times 10^{-4}$ S/cm or more was ensured. In particular, the total ion conductivities of Examples 3 and 9 were $5.0 \times 10^{-4}$ S/cm or more, and a favorable value was obtained. This showed that in the solid electrolyte pellets of Examples, the lithium ion conduction property is improved.

On the other hand, the total ion conductivities of Comparative Examples 1 and 2 were less than $2.0 \times 10^{-4}$ S/cm, and it was found that the lithium ion conduction property of Comparative Examples is inferior to that of Examples.

XRD Analysis

Figure 9:
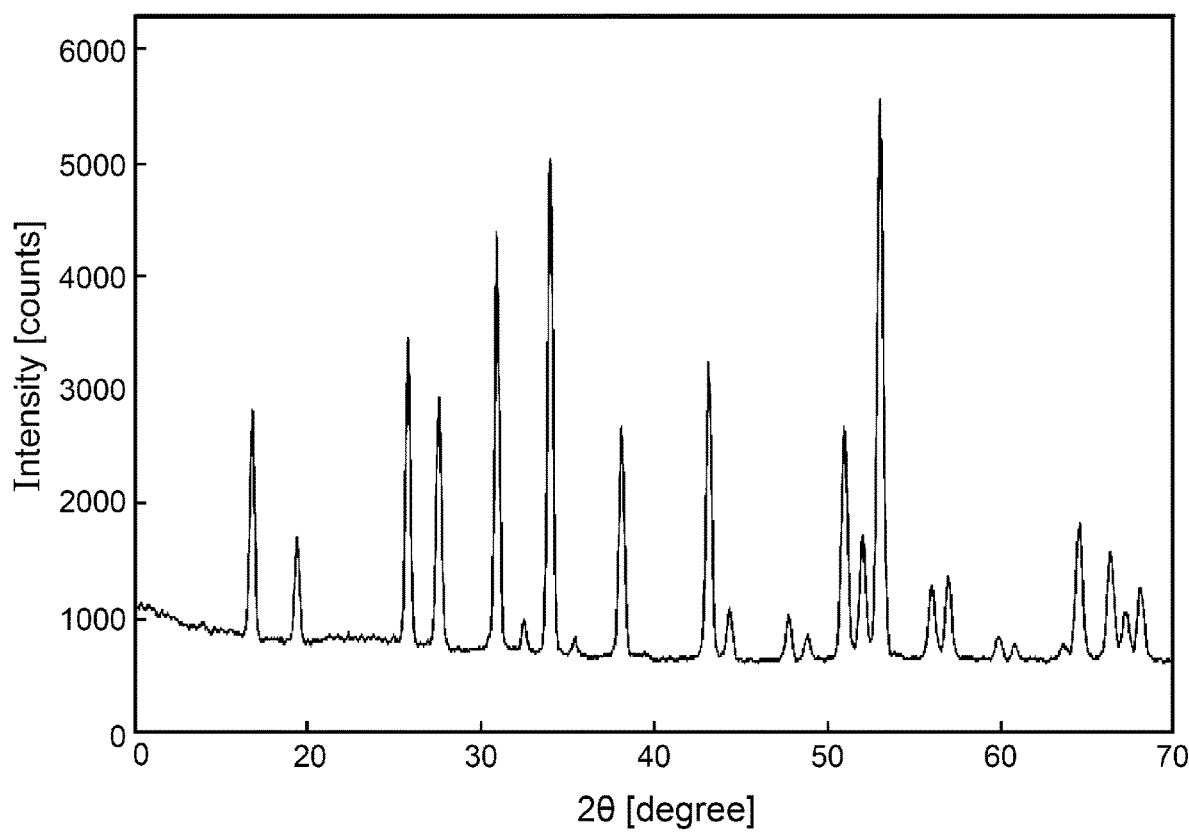
FIG. 9 is a diagram showing the X-ray diffraction chart of Example 3.

With respect to each of the solid electrolyte pellets of Examples and Comparative Examples, X-ray diffraction (XRD) analysis was performed. Specifically, byproduction of impurities and the like were examined using an X-ray diffractometer MRD (Philips). As a representative example, the X-ray diffraction chart of Example 3 is shown in FIG. 9.

The examination results of byproduction of impurities in the solid electrolyte pellet and the like will be described with reference to FIG. 9. FIG. 9 is a diagram showing the X-ray diffraction chart of Example 3 (solid electrolyte pellet). In FIG. 9, the horizontal axis represents 2θ and the vertical axis represents an intensity. As shown in FIG. 9, in Example 3, only the same diffraction peaks as those of $Li_{6.9}La_{2.95}Nd_{0.05}Zr_1Ta_{0.3}Sb_{0.7}O_{12}$ having a garnet-type crystal structure were observed, and diffraction peaks derived from impurities were not detected. That is, it was found that in Example 3, impurities are not detected, and the content of impurities is equal to or less than the lower detection limit of the X-ray diffractometer. It was found that also the solid electrolyte pellets of the other Examples and Comparative Examples have a garnet-type crystal structure in which the generation of impurities is suppressed in the same manner as that of Example 3.

Raman Scattering Analysis

Figure 10:
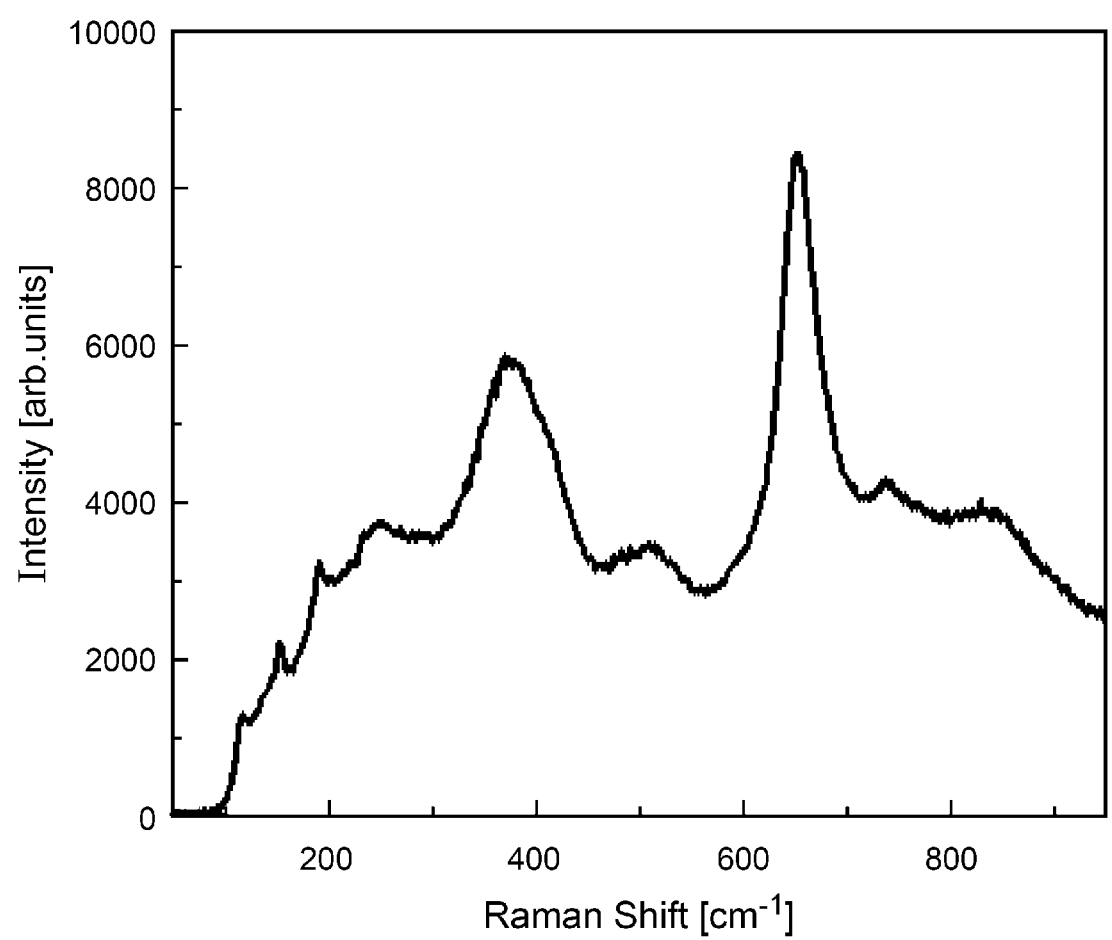
FIG. 10 is a diagram showing the Raman scattering spectrum of Example 3.

With respect to each of the solid electrolyte pellets of Examples and Comparative Examples, Raman scattering analysis was performed. Specifically, a Raman scattering spectrum was obtained using a Raman spectrometer S-2000 (JEOL Ltd.), and the crystal structure of each solid electrolyte pellet was confirmed. As a representative example, the Raman scattering spectrum of Example 3 is shown in FIG. 10.

The crystal structure of the solid electrolyte pellet will be described with reference to FIG. 10. FIG. 10 is a diagram showing the Raman scattering spectrum of Example 3 (solid electrolyte pellet). In FIG. 10, the horizontal axis represents a wavenumber and the vertical axis represents an intensity (the intensity is higher on the upper side). As shown in FIG. 10, in Example 3, the Raman scattering spectrum derived from the 24d site at around 370 cm$^{-1}$ and the 48g site at around 260 cm$^{-1}$ is broad. This shows that the solid electrolyte pellet of Example 3 has a cubic garnet-type structure as the crystal structure. It was found that also the solid electrolyte pellets of the other Examples and Comparative Example 2 have a cubic garnet-type crystal structure. On the other hand, it was found that the solid electrolyte pellet of Comparative Example 1 has a tetragonal crystal structure.

Thermal Analysis

With respect to the 540° C.-calcined body samples of Example 11 and Comparative Example 3, the tetragonal-cubic phase transition temperature and the melting point were measured by thermal analysis. Specifically, by using the above-mentioned thermal gravimetric-differential thermal analyzer TG-DTA 2000SA (product name, Bruker AXS GmbH), about 20 mg of the 540° C.-calcined body sample was weighed out in an aluminum oxide sample pan. The blank level was defined as the sample pan in an empty state, and the measurement was performed by setting the measurement conditions as follows: temperature range: from 25° C. to 1300° C., temperature increasing rate: 10° C./min, measurement atmosphere: dry air atmosphere (flow rate: 100 mL/min).

The measurement results showed that the tetragonal-cubic phase transition temperature was 874° C. in Example 11 and 908° C. in Comparative Example 3. Further, the melting point was 1163° C. in Example 11 and 1043° C. in Comparative Example 3. This showed that in Example 11, the tetragonal-cubic phase transition temperature is lowered and the melting point is increased by including neodymium (Nd).

Production of Lithium Battery

Lithium batteries were produced using the mixtures (the solutions containing the precursors) of Examples 1 to 10 and Comparative Example 2, respectively. Specifically, LiCoO$_2$ was used as the positive electrode active material, a lithium foil (thickness: about 150 μm) was used as the negative electrode, and a copper foil (thickness: about 100 μm) was used as the first current collector and the second current collector. The thickness of the positive electrode was set to about 150 μm, the thickness of the electrolyte layer was set to about 15 μm, and the effective diameter was set to about 8 mm. With respect to Comparative Example 1, since the total ion conductivity of the solid electrolyte pellet was as low as 2.6×10$^{-7}$ S/cm as described above, and therefore, evaluation as the lithium battery was omitted.

Here, in Examples 1, 3, 5, 7, and 9, the electrolyte was formed from the first electrolyte portion and the second electrolyte portion by repeating the formation of the first molded body (step S2) without using the third electrolyte portion, and the lithium battery was produced. On the other hand, in Examples 2, 4, 6, 8, and 10, and Comparative Example 2, the lithium battery was produced by the above-mentioned method using LCBO as the third electrolyte portion.

Evaluation of Battery Characteristics

With respect to the lithium batteries of Examples and Comparative Examples, charge and discharge were performed in an environment at 25° C., and the discharge capacity retention was evaluated as an index of the battery characteristics. The charge and discharge conditions at this time are shown in FIG. 11. FIG. 11 is a table showing the charge and discharge conditions and the evaluation results of the lithium batteries of Examples and Comparative Examples.

As shown in FIG. 11, in Examples 1, 3, 5, 7, and 9, the charge and discharge currents were set to 50 μA (charge and discharge rates: 0.1 C), and in Examples 2, 4, 6, 8, and 10, the charge and discharge currents were set to 150 μA (charge and discharge rates: 0.3 C). In Comparative Example 2, the charge and discharge currents were set to 20 μA (charge and discharge rates: 0.04 C).

The charge and discharge capacities when the above-mentioned charge and discharge were repeated were measured. Specifically, the charge and discharge capacities at the initial time (1st cycle) and the charge and discharge capacities after repeating 10 cycles of charge and discharge (10th cycle) were measured, and the discharge capacity retention after the 10th charge and discharge cycle with respect to the 1st charge and discharge cycle was calculated. The results are shown in FIG. 11.

As shown in FIG. 11, it was found that in any of the lithium batteries of Examples 1 to 10, a discharge capacity retention of 90% can be ensured. This showed that the lithium batteries of Examples have stable cycle characteristics and excellent battery characteristics.

On the other hand, in the lithium battery of Comparative Example 2, a discharge capacity retention of 70% cannot be ensured, and the cycle characteristics are not stable and the battery characteristics are poor as compared with Examples.

Second Embodiment

Method for Producing Battery

Figure 12:
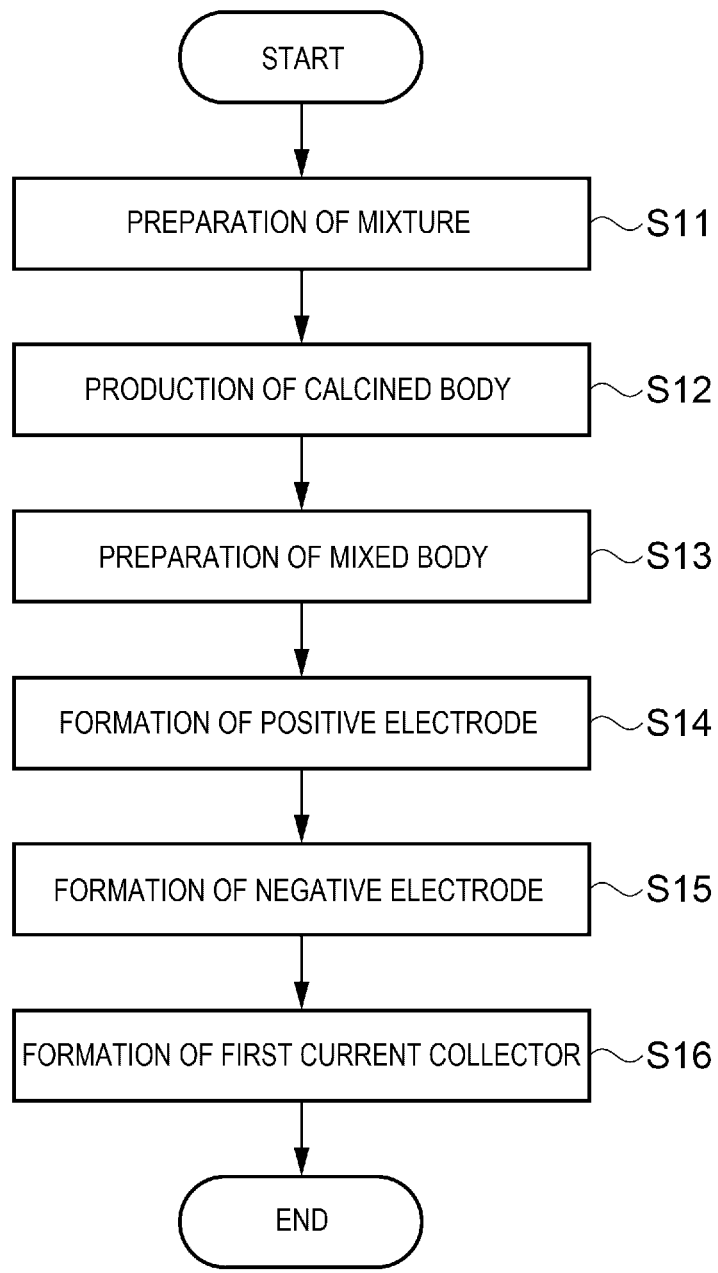
FIG. 12 is a process flowchart showing a method for producing a lithium battery as a battery according to a second embodiment.

A method for producing a lithium battery as a battery according to this embodiment will be described with reference to FIG. 12. FIG. 12 is a process flowchart showing a method for producing a lithium battery as a battery according to the second embodiment. In the production method of this embodiment, a method for producing a first electrolyte portion and a second electrolyte portion is included. The process flow shown in FIG. 12 is an example, and the method is not limited thereto. Further, the same reference numerals are used for the same constituent components as those of the first embodiment, and a repetitive description will be omitted.

The method for producing a lithium battery of this embodiment is a production method for directly forming a positive electrode as a composite body from a calcined body which is a forming material of a first electrolyte portion and a second electrolyte portion and an active material 2b without forming a first molded body (active material portion 2).

Preparation of Mixture

In a step S11 shown in FIG. 12, in the same manner as in the first embodiment, a mixture containing the precursors as the raw materials of a first electrolyte portion and a second electrolyte portion is prepared.

Production of Calcined Body

In a step S12, a calcined body is produced from the mixture. Specifically, the mixture is subjected to a first heating treatment, whereby removal of the solvent by volatilization and removal of an organic component by combustion or thermal decomposition are performed. The heating temperature is set to 500° C. or higher and 650° C. or lower. Subsequently, a solid material of the obtained mixture is ground and mixed, whereby a calcined body in the form of a powder is produced.

In a step S13, the calcined body in the form of a powder and an active material are mixed, whereby a mixed body is prepared. First, an active material 2b is prepared. Also in this embodiment, in the same manner as in the first embodiment, $LiCoO_2$ subjected to a classification operation is used as the active material. Subsequently, 0.0550 g of the calcined body in the form of a powder and 0.0450 g of $LiCoO_2$ are sufficiently stirred and mixed, whereby 0.1000 g of a mixed body is formed.

In a step S14, a positive electrode as a composite body is formed. Specifically, by using a molding die 84, the mixed body is compression molded. For example, the mixed body is pressed at a pressure of 1019 MPa for 2 minutes using the molding die 84 (see FIG. 5B) (a die with an exhaust port having an inner diameter of 10 mm), whereby a disk-shaped molded material (diameter: 10 mm, effective diameter: 8 mm, thickness: 350 μm) of the mixed body is produced.

Thereafter, the disk-shaped molded material is placed on a substrate or the like and is subjected to a second heating treatment. The heating temperature of the second heating treatment is set to 800° C. or higher and 1000° C. or lower, and sintering of the particles of the active material 2b and formation of a crystalline first electrolyte portion and an amorphous second electrolyte portion are promoted. The time of the heating treatment is preferably set to, for example, 5 minutes or more and 36 hours or less, and is more preferably 4 hours or more and 14 hours or less.

According to this, an active material portion 2 is formed from the active material 2b, whereby an electron transfer pathway is formed, and also a positive electrode in which the active material portion 2, the first electrolyte portion, and the second electrolyte portion are combined is formed.

In a step S15, a negative electrode is formed after forming an electrolyte layer. Subsequently, in a step S16, a first current collector is formed, whereby a lithium battery of this embodiment is produced. After the step S15, the same production method as in the first embodiment can be adopted.

As described above, with the use of the method for producing a lithium battery according to this embodiment, in addition to the effects of the first embodiment, the following effect can be obtained. Since the positive electrode is directly formed from the calcined body, which is the forming material of the first electrolyte portion and the second electrolyte portion, and the active material 2b, it is only necessary to perform the heating treatment at 800° C. or higher once, and so on, and the production step can be simplified.

Third Embodiment

Electronic Apparatus

Figure 13:
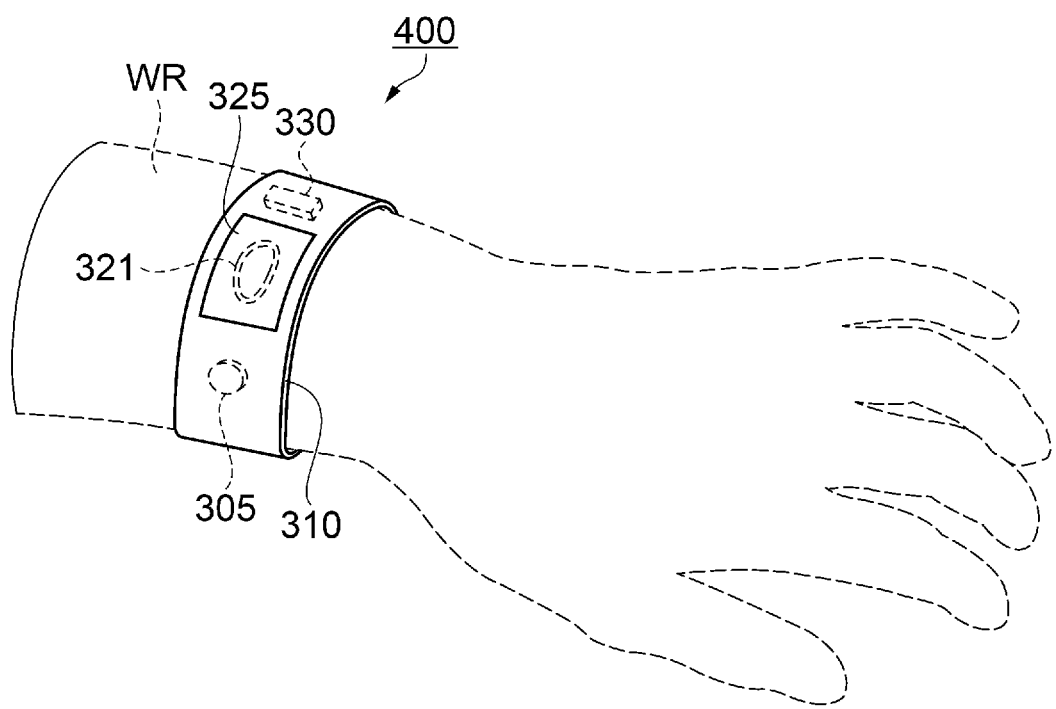
FIG. 13 is a schematic view showing a structure of a wearable apparatus according to a third embodiment.

An electronic apparatus according to this embodiment will be described with reference to FIG. 13. In this embodiment, a wearable apparatus will be described as an example of the electronic apparatus. FIG. 13 is a schematic view showing a structure of a wearable apparatus as the electronic apparatus according to the third embodiment.

As shown in FIG. 13, a wearable apparatus 400 of this embodiment is an information apparatus which is worn on, for example, the wrist WR of the human body using a band 310 like a watch, and obtains information on the human body. The wearable apparatus 400 includes a battery 305, a display portion 325, a sensor 321, and a processing portion 330. As the battery 305, the lithium battery according to the above-mentioned embodiment is used.

The band 310 has a belt-like shape using a resin having flexibility such as rubber so as to come into close contact with the wrist WR when it is worn. In an end portion of the band 310, a binding portion (not shown) capable of adjusting the binding position according to the thickness of the wrist WR is provided.

The sensor 321 is disposed in the band 310 on the inner surface side (the wrist WR side) of the band 310 so as to come into contact with the wrist WR when it is worn. The sensor 321 obtains information on the pulse rate, the blood glucose level, or the like of the human body when it comes into contact with the wrist WR, and outputs the information to the processing portion 330. As the sensor 321, for example, an optical sensor is used.

The processing portion 330 is incorporated in the band 310, and is electrically connected to the sensor 321 and the display portion 325. As the processing portion 330, for example, an integrated circuit (IC) is used. The processing portion 330 performs arithmetic processing of the pulse rate, the blood glucose level, or the like based on the output from the sensor 321, and outputs display data to the display portion 325.

The display portion 325 displays the display data such as the pulse rate or the blood glucose level output from the processing portion 330. As the display portion 325, for example, a light-receiving type liquid crystal display device is used. The display portion 325 is disposed on the outer surface side (a side opposite to the inner surface on which the sensor 321 is disposed) of the band 310 so that a wearer can read the display data when the wearer wears the wearable apparatus 400.

The battery 305 functions as a power supply source which supplies power to the display portion 325, the sensor 321, and the processing portion 330. The battery 305 is incorporated in the band 310 in an attachable and detachable manner.

According to the above configuration, the wearable apparatus 400 can obtain information on the pulse rate or the blood glucose level of a wearer from the wrist WR and can display it as information such as the pulse rate or the blood glucose level through arithmetic processing or the like. Further, to the wearable apparatus 400, the lithium battery according to the above-mentioned embodiment having an improved lithium ion conduction property and a large battery capacity in spite of having a small size is applied, and therefore, the weight can be reduced, and the operating time can be extended. In addition, since the lithium battery according to the above-mentioned embodiment is an all-solid-state secondary battery, the battery can be repeatedly used by charging, and also there is no concern about leakage of the electrolytic solution or the like, and therefore, the wearable apparatus 400 which can be used safely for a long period of time can be provided.

In this embodiment, a watch-type wearable apparatus is illustrated as the wearable apparatus 400, however, the apparatus is not limited thereto. The wearable apparatus may be a wearable apparatus to be worn on, for example, the ankle, head, ear, waist, or the like.

The electronic apparatus to which the battery 305 (the lithium battery according to the above-mentioned embodiment) is applied as the power supply source is not limited to the wearable apparatus 400. As other electronic apparatuses, for example, a display to be worn on the head such as a head-mounted display, a head-up display, a portable telephone, a portable information terminal, a notebook personal computer, a digital camera, a video camera, a music player, a wireless headphone, a portable gaming machine, and the like can be exemplified. These electronic apparatuses may have another function, for example, a data communication function, a gaming function, a recording and playback function, a dictionary function, or the like.

Further, the electronic apparatus according to this embodiment is not limited to those for general consumers and can also be applied to industrial use. In addition, the apparatus to which the lithium battery according to the above-mentioned embodiment is applied is not limited to electronic apparatuses. For example, the lithium battery according to the above-mentioned embodiment may be applied as a power supply source for a moving object. Specific examples of the moving object include automobiles, motorcycles, forklifts, and flying objects such as unmanned planes. According to this, a moving object including a battery having an improved ion conduction property as a power supply source can be provided.

The invention is not limited to the above-mentioned embodiments and various changes, modifications, etc. can be added to the above-mentioned embodiments. A modification example will be described below.

First Modification Example

Figure 14:
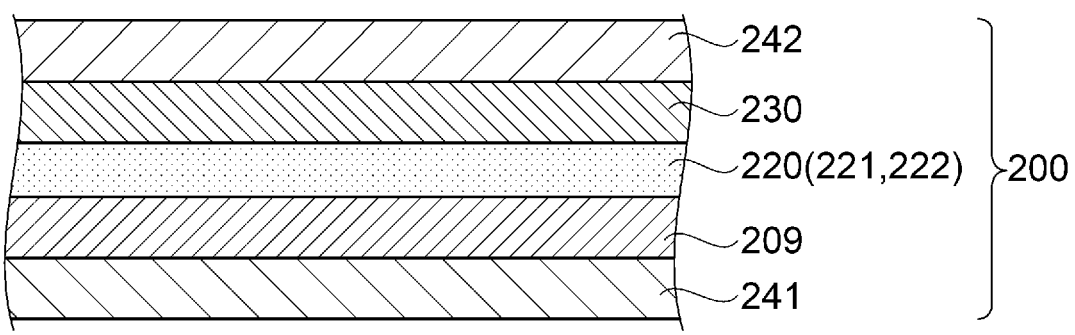
FIG. 14 is a schematic cross-sectional view showing a structure of a lithium battery as a battery according to a first modification example.

A battery according to this modification example will be described with reference to FIG. 14. In this modification example, a lithium battery will be described as an example of the battery. FIG. 14 is a schematic cross-sectional view showing a structure of a lithium battery as the battery according to the first modification example.

As shown in FIG. 14, a lithium battery 200 of this modification example includes a positive electrode 209, an electrolyte layer 220, and a negative electrode 230, which are sandwiched between a pair of current collectors 241 and 242.

The electrolyte layer 220 includes a crystalline first electrolyte portion 221 and an amorphous second electrolyte portion 222. The first electrolyte portion 221 and the second electrolyte portion 222 can be formed using the same forming material as the electrolyte of the first embodiment.

As a method for forming the electrolyte layer 220, for example, a green sheet method can be adopted. Specifically, a sheet is formed by performing calcination using a slurry containing raw materials of the first electrolyte portion 221 in the form of particles. The slurry contains a binder, a pore forming material, and the like other than the raw materials of the first electrolyte portion 221. Subsequently, an electrolyte precursor solution which contains metal compounds containing the elements constituting the second electrolyte portion 222 and a solvent capable of dissolving the metal compounds is prepared. The sheet is impregnated with the electrolyte precursor solution and repeatedly dried and fired, and thereafter subjected to a heating treatment at a temperature of 800° C. or higher and 1000° C. or lower. Incidentally, a third electrolyte portion may be formed by impregnating the sheet with the melt of a third electrolyte after impregnating the sheet with the electrolyte precursor solution. As the third electrolyte (the forming material of the third electrolyte portion), the same third electrolyte as in the first embodiment can be adopted.

According to this, the amorphous second electrolyte portion 222 is filled between the particles of the first electrolyte portion 221 inside the sheet. At the same time, the concentration gradient of the metal element contained in the first electrolyte portion 221 occurs between the first electrolyte portion 221 and the second electrolyte portion 222. Therefore, the boundary between the first electrolyte portion 221 and the second electrolyte portion 222 becomes ambiguous, and ion diffusion is promoted.

As a method for forming the positive electrode 209, for example, a green sheet method can be adopted. Specifically, the positive electrode 209 may be formed using the same positive electrode active material (active material 2b) constituting the active material portion 2 as in the first embodiment and stacked on the electrolyte layer 220 formed into a sheet shape. Similarly, as a method for forming the negative electrode 230, for example, by a green sheet method, the negative electrode 230 may be formed using the negative electrode active material constituting the negative electrode 30 of the first embodiment and stacked on the electrolyte layer 220 in the form of a sheet. The thus produced stacked body in the form of a sheet in which the positive electrode 209, the electrolyte layer 220, and the negative electrode 230 are stacked is punched into a desire size and shape, whereby a battery cell in the form of a pellet is obtained.

Examples of a method for forming the current collectors 241 and 242 on the battery cell include a method in which an appropriate adhesive layer is separately provided to adhere the current collectors 241 and 242, a gas phase deposition method such as a PVD method, a CVD method, a PLD method, an ALD method, and an aerosol deposition method, and a wet method such as a sol-gel method, an organometallic thermal decomposition method, and plating, and an appropriate method can be used according to the reactivity with the faces on which the current collectors 241 and 242 are formed, an electrical conduction property desired for the electrical circuit, and the design of the electrical circuit in the same manner as in the first embodiment. Further, as a forming material of the current collectors 241 and 242, the same forming material as in the first embodiment can be adopted. Both the current collectors 241 and 242 are not necessarily essential, and a configuration in which either one is included may be adopted.

According to the lithium battery 200 and the method for producing the lithium battery 200 described above, an excellent ion conduction property can be realized in the electrolyte layer 220, and therefore, the lithium battery 200 which is thin and has excellent battery characteristics and excellent mass productivity can be provided or produced.

The entire disclosure of Japanese Patent Application No. 2018-025777, filed Feb. 16, 2018 is expressly incorporated by reference herein.

What is claimed is:

1. An electrolyte, comprising:
a first electrolyte portion, in which one or more types of elements among the elements constituting a crystalline lithium composite metal oxide represented by the following compositional formula (1) are substituted with a first metal element having a crystal radius of 78 pm or more:

$$Li_7(La_{3-x}Nd_x)Zr_2O_{12} \tag{1}$$

where x satisfies the following formula: $0.0 < x \leq 0.6$, and
an amorphous second electrolyte portion, which contains Li and one or more types of second metal elements contained in the first electrolyte portion other than Li:
wherein, in the first electrolyte portion, Zr among the elements constituting the lithium composite metal oxide is partially substituted with the first metal element such that a concentration gradient of the first metal element occurs between the first electrolyte portion containing the first metal element and the second electrolyte portion containing the second metal element.

2. The electrolyte according to claim 1, wherein the first electrolyte portion contains a crystalline lithium composite metal oxide represented by the following compositional formula (2):

 (2)

where x and y satisfy the following formulae: $0.0 < x \leq 0.6$ and $0.1 \leq y \leq 1.0$, and M represents the first metal element.

3. The electrolyte according to claim 1, wherein the first electrolyte portion contains one or more types of Nb, Sb, and Ta as the first metal element.

4. The electrolyte according to claim 3, wherein the second electrolyte portion contains one or more types of Nb, Sb, and Ta as the second metal element, and Li, La, and Zr.

5. The electrolyte according to claim 4, further comprising an amorphous third electrolyte portion, which contains Li and is in contact with the first electrolyte portion and the second electrolyte portion.

6. The electrolyte according to claim 5, wherein the third electrolyte portion contains Li, B, and O.

7. A battery, comprising:
a composite body which includes the electrolyte according to claim 6 and an active material;
an electrode which is provided on one face of the composite body; and
a current collector which is provided on the other face of the composite body.

8. The battery according to claim 7, wherein the active material is a positive electrode active material containing Li.

9. An electronic apparatus, comprising the battery according to claim 8.

* * * * *